(12) United States Patent
Mitsumori

(10) Patent No.: US 12,482,563 B2
(45) Date of Patent: Nov. 25, 2025

(54) MEDICAL INFORMATION PROCESSING APPARATUS AND MEDICAL INFORMATION PROCESSING METHOD

(71) Applicant: CANON MEDICAL SYSTEMS CORPORATION, Otawara (JP)

(72) Inventor: Keita Mitsumori, Nasushiobara (JP)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 1165 days.

(21) Appl. No.: 17/137,628

(22) Filed: Dec. 30, 2020

(65) Prior Publication Data

US 2021/0118568 A1   Apr. 22, 2021

Related U.S. Application Data

(63) Continuation of application No. PCT/JP2020/015212, filed on Apr. 2, 2020.

(30) Foreign Application Priority Data

Apr. 5, 2019  (JP) .................... 2019-072923
Apr. 1, 2020  (JP) .................... 2020-065834

(51) Int. Cl.
*G16H 50/70*  (2018.01)
*G16H 10/60*  (2018.01)
*G16H 50/20*  (2018.01)

(52) U.S. Cl.
CPC ........... *G16H 50/20* (2018.01); *G16H 10/60* (2018.01); *G16H 50/70* (2018.01)

(58) Field of Classification Search
None
See application file for complete search history.

(56) References Cited

U.S. PATENT DOCUMENTS

2009/0248441 A1  10/2009  Okada
2010/0268543 A1*  10/2010  George ............... G16H 15/00
                                                           705/2

(Continued)

FOREIGN PATENT DOCUMENTS

JP   2008-192044 A   8/2008
JP   2008-305359 A   12/2008

(Continued)

OTHER PUBLICATIONS

Smith et al, Missing Clinical Information During Primary Care Visits, Feb. 2, 2005, JAMA, vol. 293, No. 5, pp. 565-571 (Year: 2005).*

(Continued)

*Primary Examiner* — Gregory Lultschik
(74) *Attorney, Agent, or Firm* — Oblon, McClelland, Maier & Neustadt, L.L.P.

(57) ABSTRACT

A medical information processing apparatus includes processing circuitry. The processing circuitry extracts, from diagnosis/treatment data in which a diagnosis/treatment record of a patient is written, first data indicating the diagnosis/treatment record; extracts a piece of examination data including second data indicating an examination result relevant to the first data, from one or more pieces of examination data in each of which an examination result of the patient is written; judges a correspondence relationship between an item included in the extracted first data and an item included in the second data of the extracted piece of examination data; and causes the diagnosis/treatment data and the extracted piece of examination data to be displayed on mutually the same screen, and also causes the items determined as having the correspondence relationship with each other to be displayed in an identifiable manner.

9 Claims, 13 Drawing Sheets

(56) References Cited

U.S. PATENT DOCUMENTS

| | | | | |
|---|---|---|---|---|
| 2013/0297348 A1* | 11/2013 | Cardoza | ................. | G16H 40/20 |
| | | | | 705/3 |
| 2014/0019160 A1* | 1/2014 | Loya, III | ............... | G16H 15/00 |
| | | | | 705/3 |
| 2014/0149407 A1 | 5/2014 | Qian et al. | | |
| 2015/0142472 A1* | 5/2015 | Schulte | ................. | G06F 16/313 |
| | | | | 705/3 |
| 2015/0269325 A1* | 9/2015 | Ohta | .................... | G06T 11/206 |
| | | | | 715/771 |
| 2016/0253467 A1* | 9/2016 | Kitagawa | ............... | G16H 50/20 |
| | | | | 705/2 |
| 2017/0068780 A1* | 3/2017 | Dobrean | ................ | G16H 30/40 |
| 2019/0006027 A1* | 1/2019 | Sacaleanu | ............. | G16H 50/30 |

FOREIGN PATENT DOCUMENTS

| | | |
|---|---|---|
| JP | 2009-238037 A | 10/2009 |
| JP | 2011-62283 A | 3/2011 |
| JP | 2012-155458 A | 8/2012 |
| JP | 2017-010344 A | 1/2017 |

OTHER PUBLICATIONS

Japanese Office Action issued Dec. 12, 2023 in Japanese Patent Application No. 2020-065834, 2 pages.
International Search Report issued Jun. 23, 2020 in PCT/JP2020/015212 filed on Apr. 2, 2020, 2 pages.
Office Action issued May 14, 2024, in corresponding Japanese Patent Application No. 2020-065834, 2 pages.

\* cited by examiner

| PATIENT ID | SECOND DATA | EXAMINATION RESULT ID |
|---|---|---|
| PID0001 | ... | CID0001 |
| PID0002 | ... | CID0002 |
| PID0003 | ... | CID0003 |
| ... | ... | ... |

MEDICAL INFORMATION PROCESSING APPARATUS AND MEDICAL INFORMATION PROCESSING METHOD

CROSS-REFERENCE TO RELATED APPLICATIONS

This application is based upon and claims the benefit of priority from Japanese Patent Application No. 2019-072923, filed on Apr. 5, 2019, Japanese Patent Application No. 2020-065834 filed on Apr. 1, 2020, and PCT International Application No. PCT/JP2020/015212 filed on Apr. 2, 2020; the entire contents of which are incorporated herein by reference.

FIELD

Embodiments described herein relate generally to a medical information processing apparatus and a medical information processing method.

BACKGROUND

Conventionally, medical data used in actual medical situations include various types of data such as examination data including physiological examination data and image data, as well as diagnosis/treatment data in electronic medical records or the like. Medical providers (e.g., medical doctors) provide treatment for examined subjects (e.g., patients) by comprehensively observing those various types of medical data. For example, the medical providers write (keep) records (hereinafter "diagnosis/treatment records") of diagnoses and treatments provided for the patients in diagnosis/treatment data, on the basis of the content of examination data in which examination results are recorded.

Further, a method is known by which, when keeping a diagnosis/treatment record such as the name of a disease, a medical provider registers the examination results that led to the diagnosis/treatment record, so that it is possible to understand which examination result served as a basis. However, it is a cumbersome operation and not very convenient to register an examination result serving as a basis every time a diagnosis/treatment record is entered. Further, if no examination result was registered at the time of entering a diagnosis/treatment record, it would be difficult to identify the examination result serving as a basis.

DETAILED DESCRIPTION

A medical information processing apparatus according to an embodiment includes processing circuitry. The processing circuitry is configured: to extract, from diagnosis/treatment data in which a diagnosis/treatment record of a patient is written, first data indicating the diagnosis/treatment record; to extract a piece of examination data including second data indicating an examination result relevant to the first data, from one or more pieces of examination data in each of which an examination result of the patient is written; to judge a correspondence relationship between an item included in the extracted first data and an item included in the second data of the extracted piece of examination data; and to cause the diagnosis/treatment data and the extracted piece of examination data to be displayed on mutually the same screen and to also cause the items determined as having the correspondence relationship with each other to be displayed in an identifiable manner.

Exemplary embodiments of a medical information processing apparatus and a medical information processing method will be explained below, with reference to the accompanying drawings.

Figure 1:
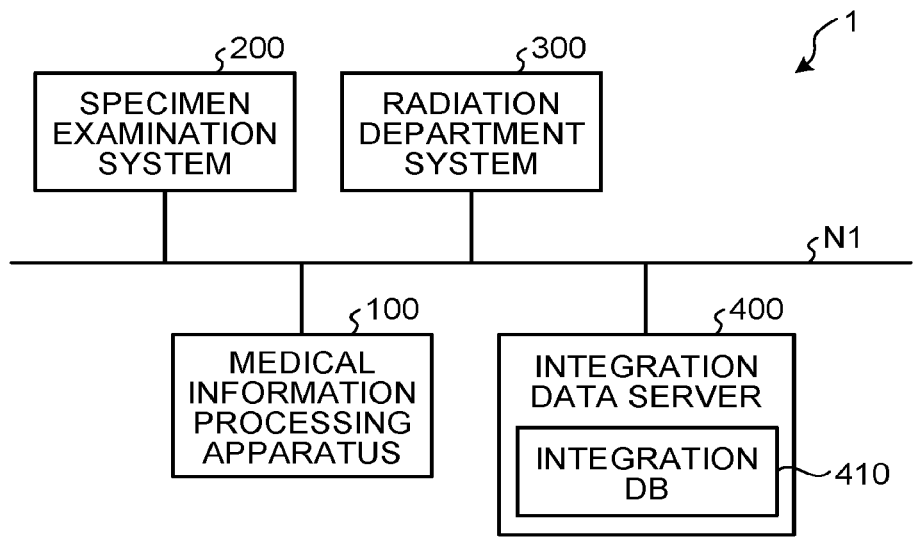
FIG. 1 is a diagram illustrating an exemplary configuration of a medical information system according to an embodiment.

FIG. 1 is a diagram illustrating an exemplary configuration of a medical information system according to an embodiment of the present disclosure. As illustrated in FIG. 1, a medical information system 1 includes a medical information processing apparatus 100, a specimen examination system 200, a radiation department system 300, an integration data server 400, and the like. The medical information processing apparatus 100, the specimen examination system 200, the radiation department system 300, and the integration data server 400 are communicably connected to one another via a network N1 such as a Local Area Network (LAN). The quantity of medical information processing apparatuses 100 connected to the network N1 is not particularly limited.

For example, one medical information processing apparatus 100 is prepared for each medical provider (medical doctor) or department and is used for various purposes. For example, the medical information processing apparatus 100 is used for displaying various types of medical data related to examined subjects (hereinafter, "patients"). Further, the medical information processing apparatus 100 is used for creating diagnosis/treatment data related to records of diagnoses and treatments provided for the examined subjects (e.g., the patients). The diagnosis/treatment data created (generated) by the medical information processing apparatus 100 is transmitted to the integration data server 400. For example, the medical information processing apparatus 100 is realized by using a computer apparatus such as a workstation, a personal computer, or a tablet terminal.

The specimen examination system 200 is configured to generate specimen examination data related to specimen examinations performed on the patients and to store the generated data into a storage within the specimen examination system 200. Further, the specimen examination system 200 is configured to transmit the specimen examination data stored in the storage to the integration data server 400.

The radiation department system 300 is configured to store image data obtained by imaging each patient, into a storage within the radiation department system 300. Further, the radiation department system 300 is configured to generate report data and conference data related to physiological examinations and image examinations performed on the patients and to store the generated data into a storage within the system. For example, the radiation department system 300 includes a Picture Archiving and Communication System (PACS) or the like. Further, examples of the image examinations include: an examination using a Computed Tomography (CT) image taken by an X-ray Computed Tomography (CT) apparatus; an examination using a Magnetic Resonance (MR) image taken by a Magnetic Resonance Imaging (MRI) apparatus; an examination using an ultrasound image taken by an ultrasound diagnosis apparatus; and an examination using an X-ray image taken by an X-ray diagnosis apparatus. Further, the radiation department system 300 is configured to transmit the image data, the report data, and the conference data stored in the storage to the integration data server 400.

The integration data server 400 is realized by using a computer apparatus such as a workstation or a server apparatus including processing circuitry such as one or more processors, as well as a semiconductor memory element such as a Random Access Memory (RAM) or a flash memory, and a storage realized with a hard disk, an optical disk, or the like.

The integration data server 400 is configured to acquire various types of data from the medical information processing apparatus 100, the specimen examination system 200, and the radiation department system 300, or the like and to store the acquired data into a storage in the server. More specifically, the storage of the integration data server 400 holds therein an integration database (DB) 410 for storing therein and managing various types of data obtained from the medical information processing apparatus 100, the specimen examination system 200, and the radiation department system 300, or the like.

For example, the integration DB 410 includes diagnosis/treatment data, specimen examination data, physiological examination data, image data, report data, conference data, and/or the like. The diagnosis/treatment data is diagnosis/treatment data such as electronic medical records related to diagnosis/treatment records of the patients and obtained from the medical information processing apparatus 100. The specimen examination data is examination data related to specimen examinations and obtained from the specimen examination system 200. The physiological examination data is examination data related to vital signs and obtained from the radiation department system 300. The image data, the report data, and the conference data are each examination data related to image examinations and obtained from the radiation department system 300. In the following sections, the diagnosis/treatment data, the specimen examination data, the physiological data, the image data, the report data, and the conference data may collectively be referred to as "medical data".

In this situation, the diagnosis/treatment data stored in the integration DB 410 includes information of the diagnosis/treatment records or the like, information indicating the dates/times of creation, information identifying the patients (patient IDs), information (medical provider IDs) identifying the creators (medical providers), and/or the like. Further, the examination data includes, in addition to information indicating the dates/times of creation and the patient IDs, numerical values (measured values) and images obtained in the examinations, information such as image interpretation reports, information indicating the examination dates/times, medical provider IDs identifying the medical providers who performed the examinations, and/or the like.

The integration data server 400 may be configured not only to acquire the medical data stored in various systems such as the medical information processing apparatus 100, the specimen examination system 200, and the radiation department system 300, but also to directly acquire medical image data obtained by the systems. Further, the integration data server 400 may be configured to acquire medical data that is present in a distributed manner on the inside and the outside of the medical information processing apparatus 100, the specimen examination system 200, and the radiation department system 300.

In the configuration of the medical information system 1 described above, the medical information processing apparatus 100 is capable of displaying any of the medical data managed by the integration data server 400. For example, a medical provider (which hereinafter may be referred to as a "user") who operates the medical information processing apparatus 100 is able to obtain examination data and diagnosis/treatment data created in the past for a patient, from the integration data server 400 and to cause the obtained data to be displayed, for the purpose of creating diagnosis/treatment data or performing a diagnosis process on the patient. Next, a configuration of the medical information processing apparatus 100 will be explained.

Figure 2:
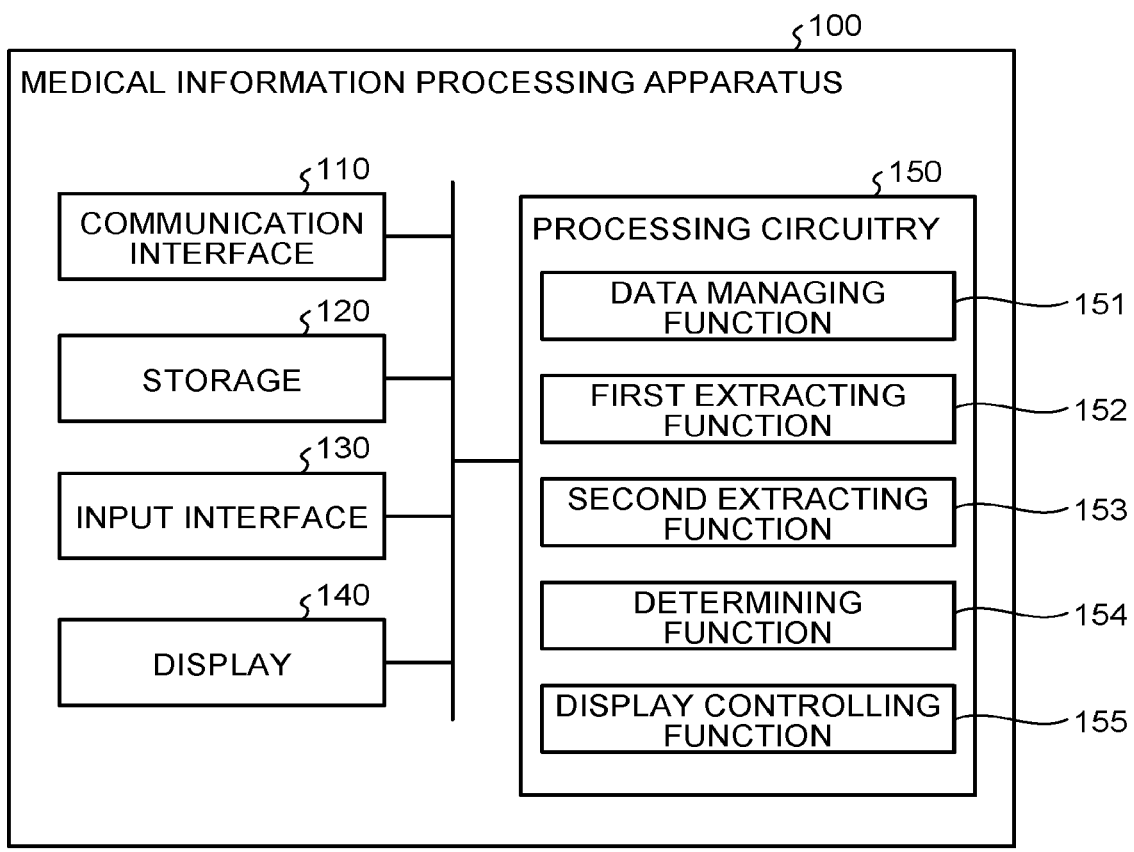
FIG. 2 is a diagram illustrating an exemplary configuration of a medical information processing apparatus according to the embodiment.

FIG. 2 is a diagram illustrating an exemplary configuration of the medical information processing apparatus 100. As illustrated in FIG. 2, the medical information processing apparatus 100 includes a communication interface 110, a storage 120, an input interface 130, a display 140, and processing circuitry 150.

The communication interface 110 is connected to the processing circuitry 150 and is configured to control transfer of various types of data and communication performed between the medical information processing apparatus 100 and various systems. More specifically, the communication interface 110 is configured to receive the medical data from the systems and to output the received medical data to the processing circuitry 150. For example, the communication interface 110 is realized by using a network card, a network adaptor, a Network Interface Controller (NIC), or the like.

The storage 120 is connected to the processing circuitry 150 and is configured to store various types of data therein. More specifically, the storage 120 is configured to store therein the medical data received from various systems. Further, the storage 120 is configured to store therein a condition setting table or the like. For example, the storage 120 is realized by using a semiconductor memory element such as a Random Access Memory (RAM) or a flash memory, or a hard disk, an optical disk, or the like. The storage 120 is an example of a means for realizing a storage unit.

The input interface 130 is connected to the processing circuitry 150 and is configured to receive operations to input various types of instructions and various types of information from an operator. More specifically, the input interface 130 is configured to convert the input operations received from the operator into electrical signals and to output the electrical signals to the processing circuitry 150. For example, the input interface 130 is realized by using a trackball, a switch button, a mouse, a keyboard, a touchpad on which input operations are performed by touching an operation surface thereof, a touch screen in which a display screen and a touchpad are integrally formed, a contactless input circuit using an optical sensor, an audio input circuit, and/or the like. The input interface 130 does not necessarily have to include physical operation component parts such as a mouse, a keyboard, and/or the like. For instance, possible examples of the input interface 130 include electrical signal processing circuitry configured to receive an electrical signal corresponding to an input operation from an external input device provided separately from the apparatus and to output the received electrical signal to the processing circuitry 150.

The display 140 is connected to the processing circuitry 150 and is configured to display various types of information and various types of images. More specifically, the display 140 is configured to convert data of the various types of information and the various types of images sent thereto from the processing circuitry 150 into display-purpose electrical signals and to output the display-purpose electrical signals. For example, the display 140 is realized by using a liquid crystal monitor, a Cathode Ray Tube (CRT) monitor, a touch panel, or the like.

The processing circuitry 150 is configured to control constituent elements of the medical information processing apparatus 100, in accordance with the input operations received from the operator via the input interface 130. More specifically, the processing circuitry 150 is configured to store the medical data output from the communication interface 110 into the storage 120. Further, the processing circuitry 150 is configured to read the medical data from the storage 120 and to cause the display 140 to display the read medical data. For example, the processing circuitry 150 is realized by using one or more processors.

Further, the medical information processing apparatus 100 has a function to assist medical providers in the work to create diagnosis/treatment data, the work to check a diagnosis/treatment record written in diagnosis/treatment data, and the like. More specifically, the medical information processing apparatus 100 includes a data managing function 151, a first extracting function 152, a second extracting function 153, a determining function 154, and a display controlling function 155. In this situation, the data managing function 151 is an example of a data generating unit. Also, the data managing function 151 is an example of a data managing unit. The first extracting function 152 is an example of a first extracting unit. The second extracting function 153 is an example of a second extracting unit. The determining function 154 is an example of a determining unit. The display controlling function 155 is an example of a display controlling unit.

The data managing function 151 is configured to perform various types of processes related to managing the medical data. For example, in collaboration with the display controlling function 155, the data managing function 151 is configured to perform a process related to creating a new piece of diagnosis/treatment data. More specifically, when a diagnosis/treatment record is input (written) via the input interface 130 or the like, the data managing function 151 generates the diagnosis/treatment data keeping the diagnosis/treatment record that was input and stores the diagnosis/treatment data into the storage 120. Further, upon receipt of an instruction to complete the creation of the diagnosis/treatment data, the data managing function 151 transmits the diagnosis/treatment data stored in the storage 120 to the integration data server 400.

In this situation, the method for inputting the diagnosis/treatment record is not particularly limited. For example, the diagnosis/treatment record may be input by using a writing method implementing a SOAP format or the like. According to the SOAP format, diagnosis/treatment records are input while separating the information in the categories of Subject (subjective information), Object (objective information), Assessment, and Plans, with respect to each symptom of a patient.

Further, when a comment or the like is input for the medical data or a specific item included in the medical data, the data managing function 151 is configured to perform a process of storing the content of the input. More specifically, the data managing function 151 stores comment data recording the content of the input so as to be kept in correspondence with the medical data or the item for which the input was made.

From diagnosis/treatment data in which a diagnosis/treatment record of a patient is written, the first extracting function 152 is configured to extract first data indicating the diagnosis/treatment record. Further, the second extracting function 153 is configured to extract examination data including second data indicating an examination result relevant to the first data, from examination data (specimen examination data, physiological examination data, image data, report data, and/or conference data) recording examination results of the patient.

In this situation, the method for realizing the first extracting function 152 and the second extracting function 153 is not particularly limited, and various methods may be adopted. In the present embodiment, a method that uses a model such as a machine learning model will be explained as a method for realizing the first extracting function 152 and the second extracting function 153.

Figures 3, 4:
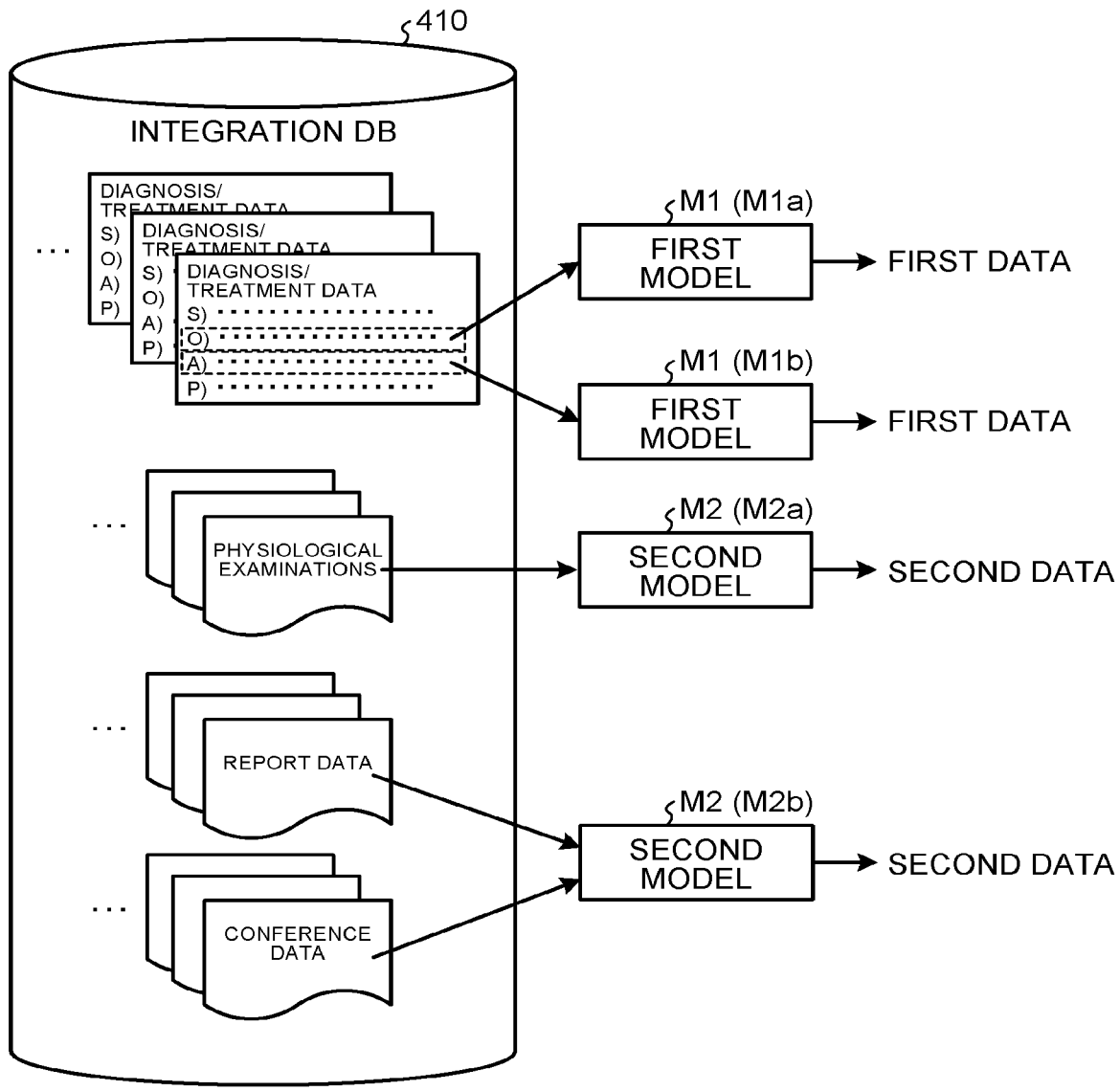
FIG. 3 is a diagram for explaining a method for generating a model related to a first extracting function and a second extracting function according to the embodiment.
FIG. 4 is a table illustrating an example of a data structure of an examination result database (DB) according to the embodiment.

To begin with, a method for generating the model related to the first extracting function 152 and the second extracting function 153 will be explained, with reference to FIG. 3. FIG. 3 is a diagram for explaining the method for generating the model related to the first extracting function 152 and the second extracting function 153.

At first, a model (hereinafter, "first model") M1 related to the first extracting function 152 is generated from pieces of diagnosis/treatment data of a plurality of patients from the past stored in the integration DB 410 within the integration data server 400. More specifically, the first model M1 capable of outputting the first data indicating the diagnosis/treatment record is generated by receiving inputs of the pieces of diagnosis/treatment data stored in the integration DB 410 and analyzing (machine learning) relationships between character strings expressing the diagnosis/treatment records indicated in the pieces of diagnosis/treatment data on a word level or a context level. In this situation, the first data output from the first model M1 is generated in a format that enables comparison with the examination result (the second data described below) in the examination data. For example, the first data is structured with items using word groups, character strings, and the like of which relevance can be compared with those of the second data.

To analyze the diagnosis/treatment records, it is possible to use a technique such as Word2Vec or Doc2Vec, for example. When such a technique is used, the first data is output as vector data in which the character strings expressing the diagnosis/treatment record are vectorized on the word level or the context level. Further, by using a rule engine or the like that recognizes the SOAP format, the first model M1 may be generated for each item while using one of the four categories of SOAP as an analysis target. FIG. 3 illustrates an example in which, while using the categories of O and A as analysis targets, the first model M1 (a first model M1a and another first model M1b) is generated for each of the categories.

Further, another model (hereinafter "second model") M2 related to the second extracting function 153 is generated from pieces of examination data of a plurality of patients from the past stored in the integration DB 410. More specifically, the second model M2 capable of outputting the second data indicating the examination result is generated by receiving inputs of the pieces of examination data and analyzing (machine learning) relationships among character strings expressing the examination results indicated in the pieces of examination data on a word level or a context level. In this situation, the second data output from the second model M2 is generated in a format that enables comparison with the diagnosis/treatment result (the first data) in the diagnosis/treatment data. For example, the second data is structured with items using word groups, character strings, and the like of which relevance can be compared with those of the first data.

To analyze the examination results, it is possible to use a technique such as Word2Vec or Doc2Vec, for example, similarly to the analysis of the diagnosis/treatment records. When such a technique is used, the second data is output as vector data in which the character strings expressing the examination results are vectorized on the word level or the context level. Further, by using a rule engine or the like that recognizes the format of the examination data, a specific examination result or the like may be set as an analysis target.

Further, as for the second model M2, a single second model M2 may be generated from examination data of mutually-different types, or a second model M2 may be generated for each of different types of examination data. FIG. 3 illustrates an example in which a second model M2a is generated from physiological examination data, whereas a second model M2b is generated from report data and conference data.

When the examination data is image data, a second model M2 capable of outputting features expressed in images as the second data may be generated by analyzing (machine learning) the features expressed in the images. Further, when the examination results are expressed as measured values such as vital signs, it is desirable to generate a second model M2 capable of outputting information in a format that also takes chronological change ratios of numerical values into account.

Further, in the medical information system 1, an examination result DB 420 generated by using the second model M2 described above is prepared, as a data set related to operations of the second extracting function 153. With respect to each of the pieces of examination data stored in the integration DB 410, the examination result DB 420 stores therein the second data obtained by inputting the piece of examination data to the second model M2, so as to be kept in correspondence therewith.

FIG. 4 is a table illustrating an example of a data structure of the examination result DB 420. As illustrated in FIG. 4, the examination result DB 420 stores therein the patient ID of a patient related to examination data D2, second data obtained by inputting the examination data D2 to the second model M2, and an examination result ID identifying the examination data D2, so as to be kept in correspondence with one another.

It is assumed that the first model M1 and the second model M2 described above are generated in advance; however, the apparatus that generates the models is not particularly limited. For example, the first model M1 and the second model M2 may be generated by the integration data server 400 or may be generated by an apparatus exclusively used for generating the models. Further, the first model M1, the second model M2, and the examination result DB 420 may be stored in the storage 120 or the like of each of the medical information processing apparatuses 100 or may be stored in another apparatus such as the integration data server 400. In the latter situation, the first extracting function 152 and the second extracting function 153 perform the extracting processes by using the first model M1 and the examination result DB 420 stored in the other apparatus such as the integration data server 400.

Figure 5:
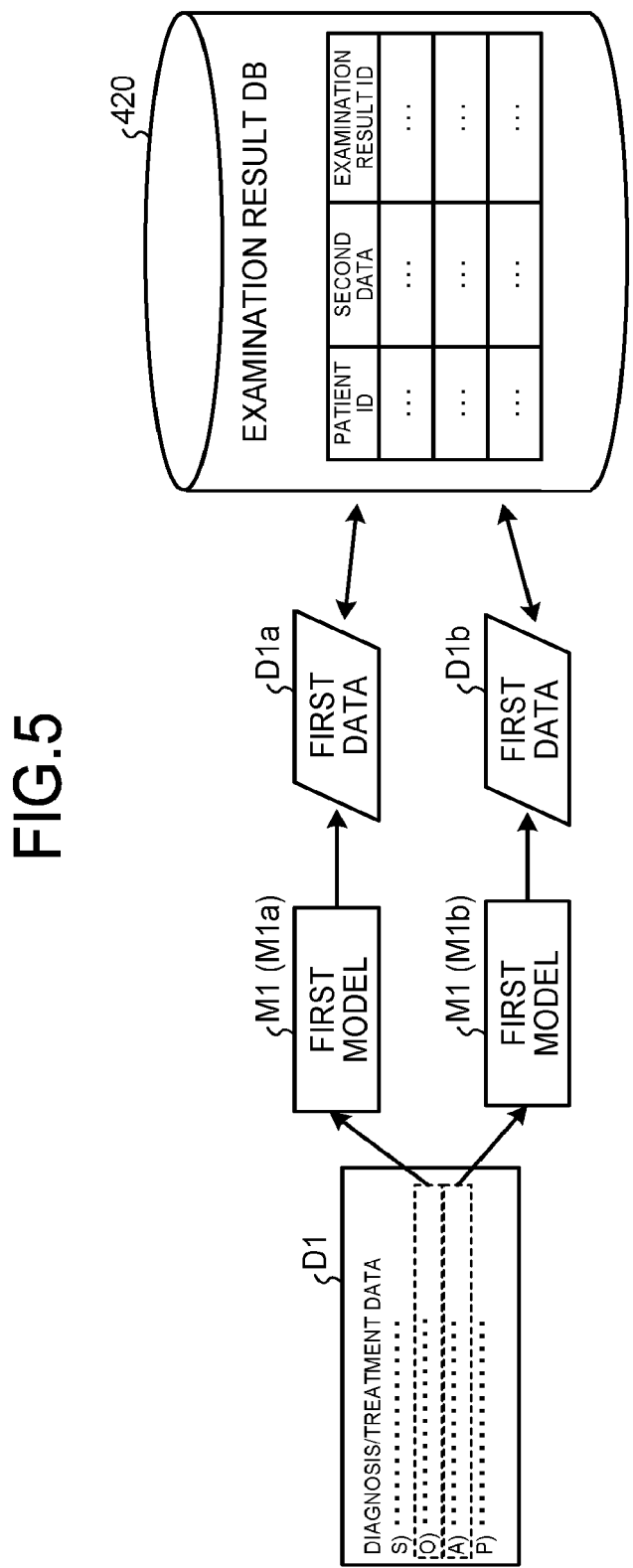
FIG. 5 is a diagram for explaining examples of operations performed by the first extracting function and the second extracting function according to the embodiment.

Next, operations of the first extracting function 152 and the second extracting function 153 using the first model M1 and the examination result DB 420 described above will be explained, with reference to FIG. 5. FIG. 5 is a diagram for explaining examples of the operations performed by the first extracting function 152 and the second extracting function 153.

For example, upon receipt of an instruction from the user indicating that a written record be checked or the like with respect to newly-created diagnosis/treatment data D1 of a patient, the first extracting function 152 inputs the diagnosis/treatment data D1 to the first model M1. Further, the first extracting function 152 extracts (obtains) an output result from the first model M1 as first data D1a indicating the diagnosis/treatment record written in the diagnosis/treatment data D1. FIG. 5 illustrates an example in which pieces of first data D1a and D1b are extracted by using the first models M1a and M1b generated for the categories of O and A among the SOAP categories structuring the diagnosis/treatment data D1.

Further, by referring to the examination result DB 420, the second extracting function 153 identifies examination data (an examination result ID) of the patient including the second data relevant to the first data D1a and D1b extracted by the first extracting function 152. More specifically, by referring to the examination result DB 420, the second extracting function 153 narrows down data entries including the patient ID of the patient related to the diagnosis/treatment data D1. Subsequently, the second extracting function 153 compares the first data D1a and D1b extracted by the first extracting function 152 with the second data included in the narrowed-down data entries and further identifies the examination result ID of the data entry including the second data relevant to each of the first data D1a and D1b. After that, the second extracting function 153 extracts the examination data corresponding to the identified examination result IDs from the integration DB 410.

In this situation, it is possible to calculate a degree of relevance between the first data D1a, D1b and the second data by using a publicly-known technique. For example, when both the first data D1a, D1b and the second data are each expressed with vector data, it is possible to calculate the degree of relevance between the two types of data on the basis of the angle formed by the two vectors, or the like. In this situation, the degree of relevance is an index indicating the strength of a correspondence relationship or a correlational relationship between the first data and the second data. The higher the degree of relevance is, the more written records that are the same or similar are included. In other words, by identifying the second data having a higher degree of relevance by using a threshold value or the like, the second extracting function 153 is configured to identify the examination data having written therein the examination result serving as a basis of the diagnosis/treatment record written in the diagnosis/treatment data D1. After that, the second extracting function 153 stores the identified examination result ID so as to be kept in correspondence with a medical record ID identifying the diagnosis/treatment data D1 being the processing target. In this situation, when there are two or more pieces of second data each having a degree of relevance exceeding the threshold value, the second extracting function 153 may identify one piece of second data having the highest degree of relevance or may identify all the pieces of second data.

As explained above, by using the first model M1, the first extracting function 152 is configured to extract the first data indicating the diagnosis/treatment record from the diagnosis/treatment data of the patient being the processing target. Further, the second extracting function 153 is configured to extract the examination data including the second data indicating the examination result relevant to the first data extracted by the first extracting function 152, i.e., the examination data including the examination result serving as a basis of the diagnosis/treatment record.

Returning to the description of FIG. 2, the determining function 154 is configured to judge correspondence relationships between items, by comparing items included in the first data extracted by the first extracting function 152 with items included in the second data of the examination data identified by the second extracting function 153. In this situation, the items included in the first data and the second data denote, for example, character strings (which may be numerical values) that express diagnosis/treatment records and examination results and are separated on a word level or a context level.

More specifically, between the items included in the first data and the items included in the second data, when there are items having mutually the same character string or items in which what is signified by character strings are similar, the determining function 154 determines that the two items have a correspondence relationship with each other. Further, among the items included in the first data and the items included in the second data, when there is an independent item that does not have a correspondence relationship, the determining function 154 determines that these item has no correspondence relationship.

For example, when the first data includes no content corresponding to the items included in the second data, the determining function 154 determines that the items have no correspondence relationship. In that situation, it means that the examination results of the items determined as having no correspondence relationship are not reflected in the diagnosis/treatment record in the diagnosis/treatment data. As another example, when the second data includes no content corresponding to the items included in the first data, the determining function 154 determines that the items have no correspondence relationship. In that situation, it means that the diagnosis/treatment records of the items determined as having no correspondence relationship are not based on the examination results in the examination data. Further, the determining function 154 may be configured to judge such correspondence relationships with respect to all the items in the first data and the second data or may be configured to judge such correspondence relationships with respect to items expressed with character strings or terms in a predetermined format.

The display controlling function 155 is configured to collaborate with the data managing function 151, the first extracting function 152, the second extracting function 153, and the determining function 154 described above and to cause the display 140 to display various types of screens for assisting medical providers.

Figure 6:
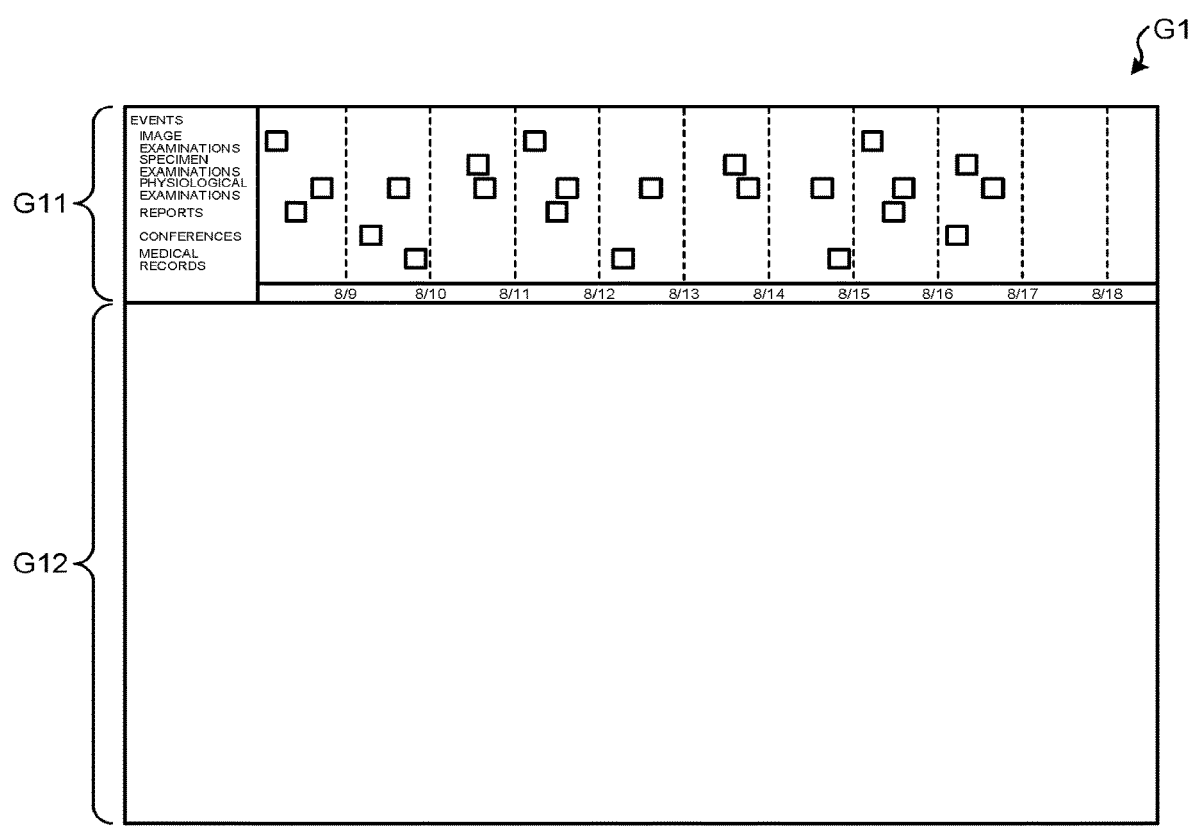
FIG. 6 is a drawing illustrating an example of a screen displayed by a display controlling function according to the embodiment.

FIG. 6 is a drawing illustrating an example of a screen displayed by the display controlling function 155. As illustrated in FIG. 6, the screen G1 includes a timeline display region G11 and a data display region G12.

In the timeline display region G11, medical actions performed for the patient are displayed as events in a chronological order. Examples of the events include: obtainment events of specimen examinations (specimen examinations) performed by the specimen examination system 200; obtainment events of physiological examination data (physiological examinations) performed by the radiation department system 300; obtainment events of image data, report data, and conference data (image examinations, reports, and conferences) performed by the radiation department system 300; and obtainment events of diagnosis/treatment data (medical records) performed by the medical information processing apparatus 100. For example, the display controlling function 155 is configured to display figures that symbolically express the content of the events in the diagnosis/treatment actions performed for the patient, so as to be arranged in the chronological order.

Upon receipt of an operation to designate one of the events displayed in the timeline display region G11 via the input interface 130 or the like, the display controlling function 155 refers to the integration data server 400 and obtains the medical data corresponding to the designated event. As another example, upon receipt of an operation to designate a point in time or a time period in one of the displayed time periods being displayed in the timeline display region G11, the display controlling function 155 refers to the integration data server 400 and obtains the medical data corresponding to the event carried out at the point in time or in the time period being designated. After that, the display controlling function 155 causes the obtained medical data to be displayed in the data display region G12.

For example, when the medical data is image data, the display controlling function 155 is configured to cause the content of the image data to be displayed in the data display region G12. In another example, when the medical data is specimen examination data, physiological examination data, or the like, the display controlling function 155 causes a measured value at the designated point in time, measured values obtained in the designated time period, a graph indicating chronological changes of the measured values, and/or the like to be displayed in the data display region G12.

In this situation, in the data display region G12, each of the pieces of medical data is displayed in a different one of small regions (hereinafter, "panels") that are each smaller than the data display region G12. With this arrangement, the data display region G12 is able to display the plurality of pieces of medical data on mutually the same screen.

In this situation, the size of each of the panels is not particularly limited. For example, the size of each of the panels may be a fixed value determined for a corresponding data type of the medical data or may dynamically be changed in accordance with the number of pieces of medical data being displayed. Further, the number of panels that can be displayed in the data display region G12 is not particularly limited, either, and may be a fixed value or may dynamically be increased or decreased in accordance with the number of pieces of medical data being displayed or the like. Further, the layout of the panels is not particularly limited, either, and may be a fixed layout or may dynamically be changed in accordance with the number of pieces of medical data being displayed, or the like.

Further, the display controlling function 155 is configured to cause a panel used for creating a new piece of diagnosis/treatment data to be displayed in the data display region G12, by collaborating with the data managing function 151. More specifically, upon receipt of an instruction via the input interface 130 or the like indicating that a new piece of diagnosis/treatment data be created, the display controlling function 155 is configured to cause a panel in which it is possible to input a diagnosis/treatment record to be displayed in the data display region G12.

Figure 7:
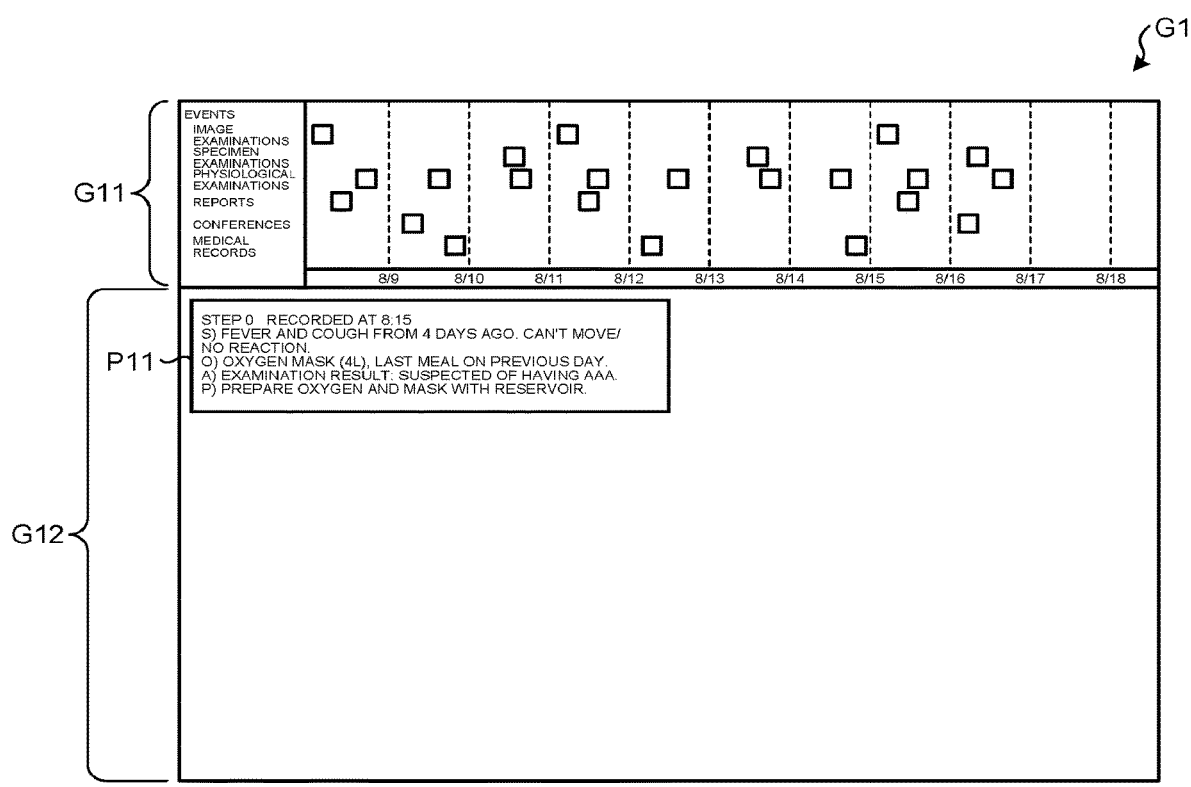
FIG. 7 is a drawing illustrating another example of a screen displayed by the display controlling function according to the embodiment.

FIG. 7 is a drawing illustrating another example of a screen displayed by the display controlling function 155 and illustrates an example in which a panel P11 related to newly creating diagnosis/treatment data is displayed in the data display region G12. In this situation, in the panel P11, it is possible to input characters via the input interface 130 or the like. The user of the medical information processing apparatus 100 inputs a record of a diagnosis and/or treatment provided for the patient into the panel P11 by operating the input interface 130 or the like. FIG. 7 illustrates an example in which the diagnosis/treatment record of the patient has been input by using the SOAP format.

After the diagnosis/treatment record has been input to the panel P11, upon receipt of an instruction via the input interface 130 or the like indicating that written records be checked or the creating process be completed, the data managing function 151 saves the input content in the panel P11 into the storage 120 as a new piece of diagnosis/treatment data. After that, for example, when the new piece of diagnosis/treatment data has been saved in the storage 120, the first extracting function 152 extracts first data from the piece of diagnosis/treatment data. Further, in conjunction with the extraction of the first data, the second extracting function 153 and the determining function 154 perform operations.

The display controlling function 155 is configured to cause the diagnosis/treatment data from which the first data was extracted by the first extracting function 152 and the examination data extracted by the second extracting function 153 to be displayed on mutually the same screen. More specifically, the display controlling function 155 causes the examination data extracted by the second extracting function 153 to be displayed in the data display region G12 displaying the new piece of diagnosis/treatment data (the panel P11). Further, the display controlling function 155 causes items determined by the determining function 154 as having a correspondence relationship with each other to be displayed in an identifiable manner. Further, the display controlling function 155 causes items determined by the determining function 154 as having no correspondence relationship to be displayed in an identifiable manner.

Figure 8:
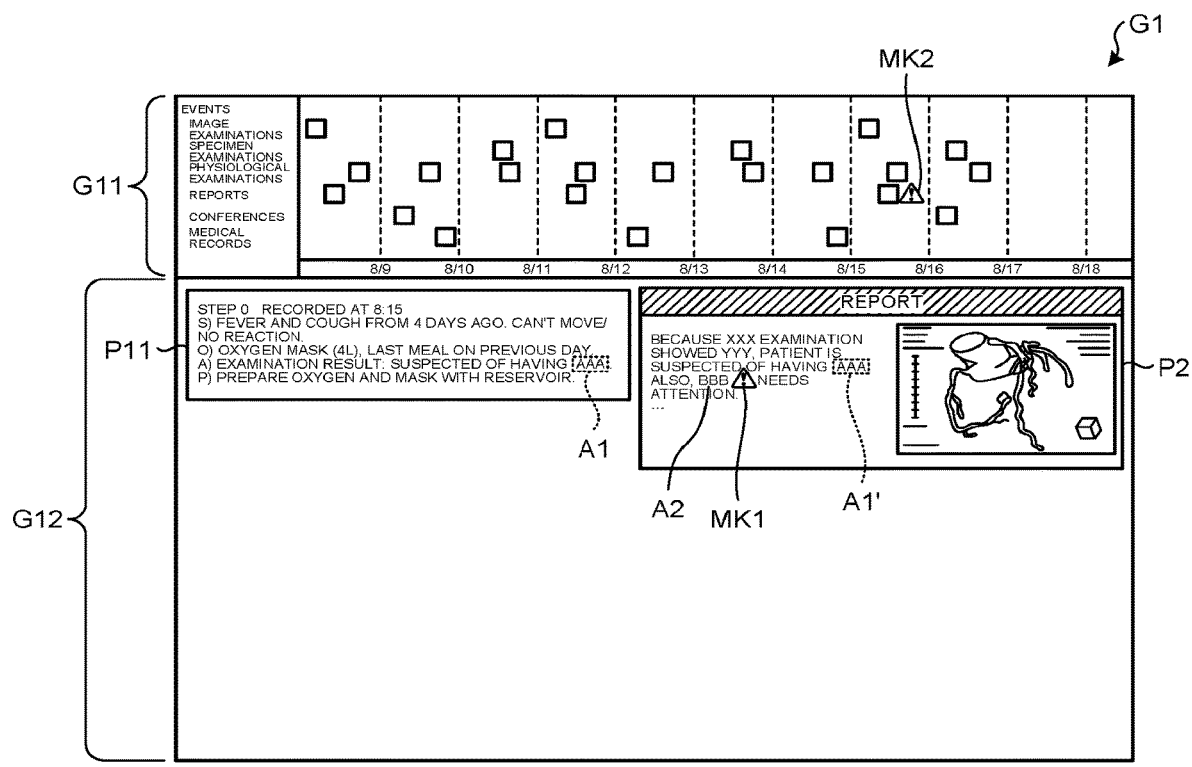
FIG. 8 is a drawing illustrating yet another example of a screen displayed by the display controlling function according to the embodiment.

FIG. 8 is a drawing illustrating yet another example of a screen displayed by the display controlling function 155 and illustrates a state in which the examination data extracted by the second extracting function 153 is displayed in the data display region G12 illustrated in FIG. 7. In FIG. 8, the display controlling function 155 causes the examination data extracted by the second extracting function 153 to be displayed in a panel P2 within the data display region G12, together with the panel P11. In other words, the display controlling function 155 causes the diagnosis/treatment data and the examination data indicating the examination result serving as a basis of the diagnosis/treatment data to be displayed on mutually the same screen.

Further, the display controlling function 155 causes an item A1 in the panel P11 and another item A1' in the panel P2 determined by the determining function 154 as having a correspondence relationship with each other to be displayed in an identifiable manner. For example, the display controlling function 155 causes the items having a correspondence relationship with each other to be displayed in an identifiable manner, by enclosing those items in frames in the same color or using the same type of line. As a result, by viewing the diagnosis/treatment data and the examination data displayed in the identifiable manner, the user of the medical information processing apparatus 100 is able to easily understand where in the examination data the examination result serving as a basis of the diagnosis/treatment record is positioned.

Further, the item A2 in the panel P2 is present in the second data, but is not present in the first data and is therefore an item determined as having no correspondence relationship. For this reason, the display controlling function 155 causes the item A2 to be displayed in an identifiable manner. More specifically, the display controlling function 155 causes the item A2 to be displayed with an emphasis so as to be identifiable, by appending a marker MK1 to be displayed with the item A2. As a result of the marker MK1 being appended to the item A2, the item A2 is displayed with the emphasis. With this arrangement, the user of the medical information processing apparatus 100 is able to easily understand which one of the items written in the examination data is not reflected in the diagnosis/treatment data.

Further, in FIG. 8, among the events displayed in the timeline display region G11, the display controlling function 155 causes an event corresponding to the examination data including the item determined as having no correspondence relationship to be displayed in an identifiable manner. More specifically, the display controlling function 155 causes the event to be displayed with an emphasis so as to be identifiable, by appending a marker MK2 to be displayed with the event corresponding to the examination data indicated in the panel P2. With this arrangement, the user of the medical information processing apparatus 100 is able to easily understand which one of the events displayed in the timeline display region G11 is an event related to the examination data determined as having no correspondence relationship.

With reference to FIG. 8, the display example was explained in which the first data includes no content corresponding to the items included in the second data; however, the display is similarly controlled when the second data includes no content corresponding to the items included in the first data. More specifically when the second data includes no content corresponding to the items included in the first data, the display controlling function 155 displays the corresponding items included in the first data with an emphasis or the like so as to be identifiable.

Further, in response to an operation performed via the input interface 130 or the like, the display controlling function 155 is configured to cause a user interface to be displayed in the data display region G12 in which it is possible to input a comment related to an item or medical data determined as having no correspondence relationship. The operation method for instructing the comment input is not particularly limited; however, for example, the marker MK1 may be caused to function as an operation element used for inputting a comment related to the item A2. In that situation, upon receipt of an operation on the marker MK1, the display controlling function 155 causes an input region W1 to be displayed in the data display region G12, as illustrated in FIG. 9, in which it is possible to input a comment related to the item A2.

Figure 9:
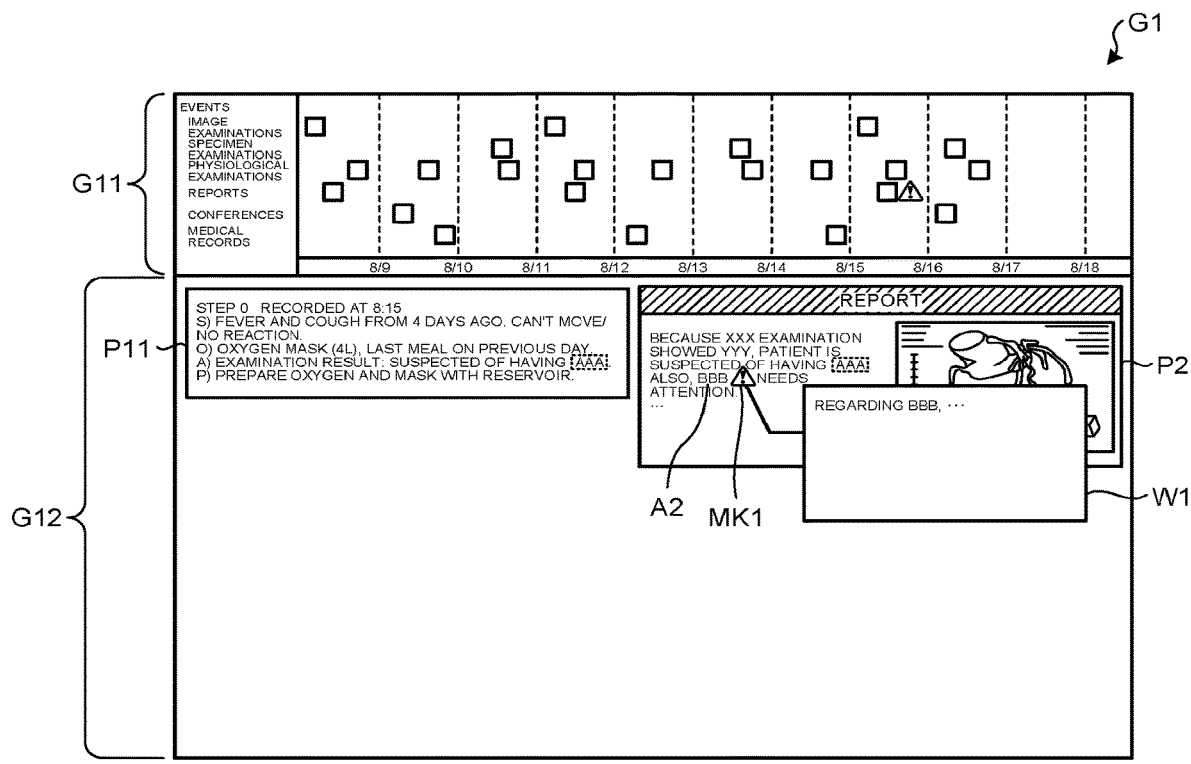
FIG. 9 is a drawing illustrating yet another example of a screen displayed by the display controlling function according to the embodiment.

FIG. 9 is a drawing illustrating yet another example of a screen displayed by the display controlling function 155 and illustrates a screen example observed when the marker MK1 in FIG. 8 has been operated. In the input region W1 in FIG. 9, it is possible to input characters via the input interface 130 or the like. By operating the input interface 130 or the like, the user of the medical information processing apparatus 100 is able to input a comment related to the item A2 or the like, in the input region W1.

The content of the input in the input region W1 is not particularly limited, and it is possible to input arbitrary content. For example, it is possible to input, as the comment related to the item A2, content (hereinafter, "reason of rejection") explaining why an examination result related to the item A2 was not written in the diagnosis/treatment record. In another example, it is possible to input, as the comment related to the item A2, content (hereinafter, "examination request") requesting that an examination corresponding to an examination result of the item A2 be carried out. The comment input to the input region W1 is stored by the data managing function 151 as comment data, for example, so as to be kept in correspondence with the item A2 and the diagnosis/treatment data including the item A2. For example, the content of the comment data making the examination request is checked by a person in charge of the system at the source where the examination data is generated, so that the examination is carried out for the patient.

Further, the display controlling function 155 may cause a dedicated input region W1 to be displayed for each of various purposes of comments. For example, upon receipt of an operation performed on the marker MK1, the display controlling function 155 may cause a selectable component part to be displayed so that it is possible to select one of the purposes from between a reason of rejection and an examination request, so as to display an input region corresponding to the selected purpose. In that situation, depending on the selected purpose, the data managing function 151 may switch between managing methods of the comment data. For example, when comment information serving as an examination request is input, the comment data may be transmitted to the system that will carry out the examination related to the examination data or the item to which the marker MK1 is appended.

With reference to FIG. 9, the example was explained in which it is possible to input the comment regarding the examination data; however, possible embodiments are not limited to this example. Another arrangement is similarly acceptable where it is also possible to input a comment regarding the diagnosis/treatment data. For example, when a predetermined operation is performed on the diagnosis/treatment data displayed in the data display region G12, the display controlling function 155 may cause an input region W2 to be displayed while being kept in correspondence with the diagnosis/treatment data, as illustrated in FIG. 10.

Figure 10:
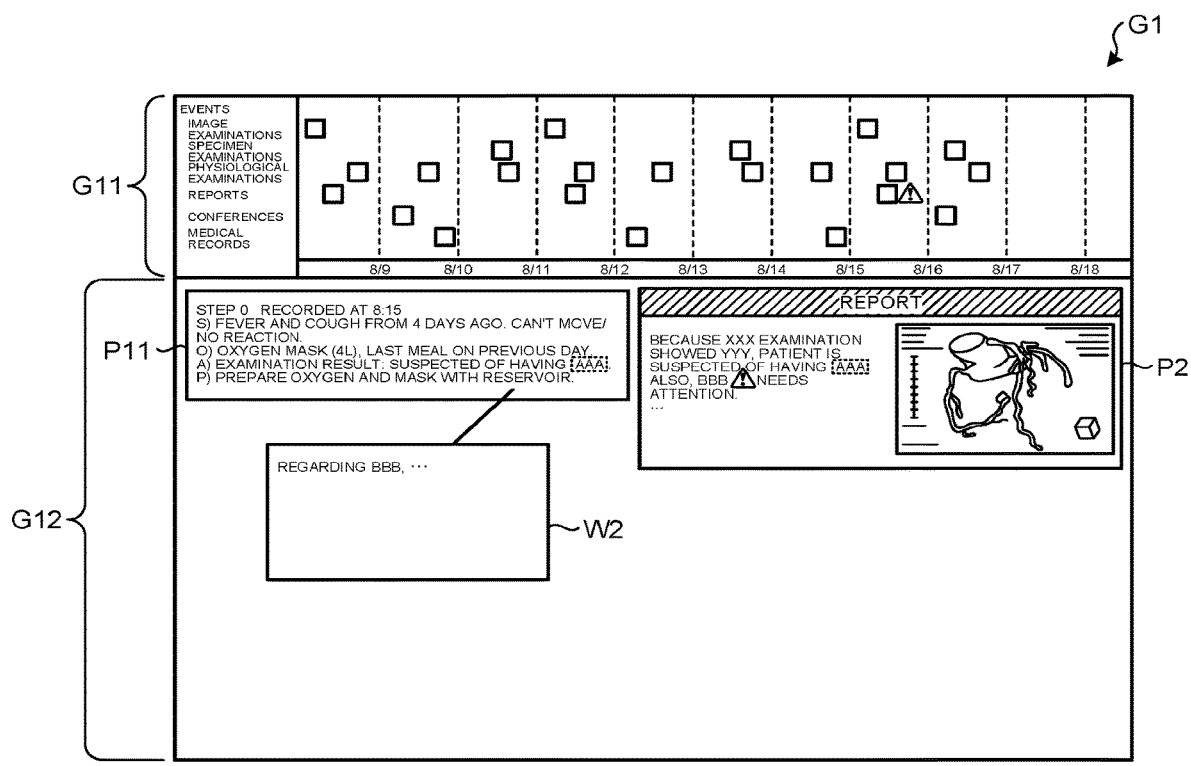
FIG. 10 is a drawing illustrating yet another example of a screen displayed by the display controlling function according to the embodiment.

FIG. 10 is a drawing illustrating yet another example of a screen displayed by the display controlling function 155 and illustrates a screen example observed when a comment input instruction has been issued in the panel P11 in FIG. 8. Upon receipt of a predetermined operation performed on the panel P11, the display controlling function 155 causes the input region W2 to be displayed so as to be kept in correspondence with the panel P11. Similarly to the input region W1, it is possible to input characters in the input region W2 via the input interface 130 or the like. By operating the input interface 130 or the like, the user of the medical information processing apparatus 100 is able to input a comment related to the item A2 or to the diagnosis/treatment data, in the input region W2.

For example, it is possible to input, as the comment related to the item A2 or to the diagnosis/treatment data, content (a reason of rejection) explaining why the diagnosis/treatment record related to the item A2 was not reflected in the diagnosis/treatment data. The comment input to the input region W2 is stored by the data managing function 151 as comment data, so as to be kept in correspondence with the diagnosis/treatment data, for example. Further, until an instruction to complete the diagnosis/treatment data creating process is issued, it is also possible edit the diagnosis/treatment record itself in the diagnosis/treatment data.

Further, the number of pieces of diagnosis/treatment data displayed in the data display region G12 does not necessarily have to be one and may be two or more. For example, when there are two or more pieces of diagnosis/treatment data being created, the display controlling function 155 may cause these pieces of diagnosis/treatment data to be displayed in the data display region G12. Further, for example, the display controlling function 155 may also cause diagnosis/treatment data from the past designated from within the timeline display region G11 to be displayed in the data display region G12 together with the diagnosis/treatment data currently being created. Further, the diagnosis/treatment data from the past may be excluded from the processing targets of the first extracting function 152, the second extracting function 153, and the determining function 154 or may be regarded as a processing target similarly to a newly-created piece of diagnosis/treatment data.

Figure 11:
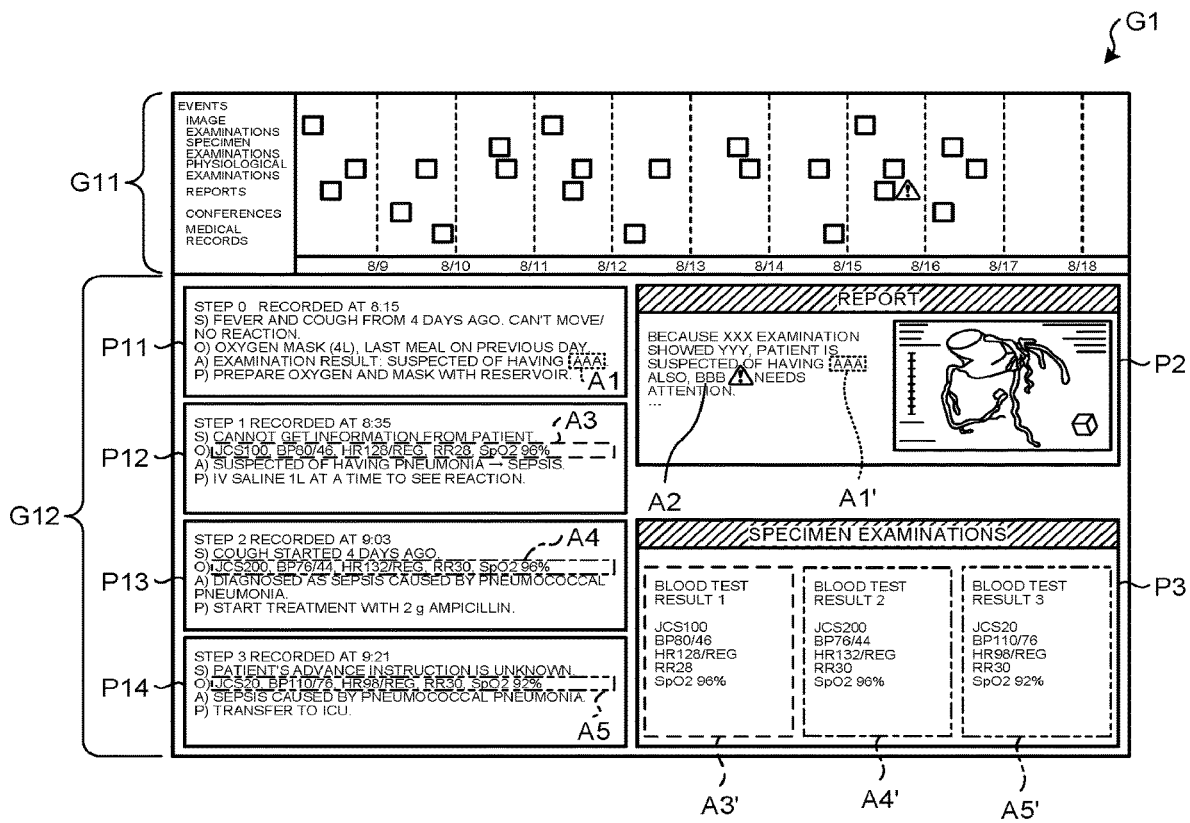
FIG. 11 is a drawing illustrating yet another example of a screen displayed by the display controlling function according to the embodiment.

FIG. 11 is a drawing illustrating yet another example of a screen displayed by the display controlling function 155 and illustrates a screen example observed when a plurality of pieces of diagnosis/treatment data are displayed. In the present example, the panels P11, P12, P13, and P14 on the left side in the data display region G12 display pieces of diagnosis/treatment data at mutually-different points in time. Further, the panels P2 and P3 on the right side in the data display region G12 display pieces of examination data extracted by the second extracting function 153 on the basis of the pieces of diagnosis/treatment data displayed in the panels P11, P12, P13, and P14. In this situation, the contents of the panels P11 and P2 are the same as those illustrated in FIG. 8.

In FIG. 11, the panel P3 displays the content of three pieces of examination data (specimen examinations) relevant to diagnosis/treatment records of the diagnosis/treatment data displayed in the panels P12 to P14. More specifically, the item A3' displayed in the panel P3 corresponds to the item A3 included in the diagnosis/treatment data in the panel P12. Further, the item A4' displayed in the panel P3 corresponds to the item A4 included in the diagnosis/treatment data in the panel P13. Also, the item A5' displayed in the panel P3 corresponds to the item A5 included in the diagnosis/treatment data in the panel P14. In the present example, the display controlling function 155 is displaying the pairs of items having the correspondence relationships with each other in an identifiable manner, similarly to the example in FIG. 7.

In FIG. 10, because the pieces of examination data relevant to the diagnosis/treatment data in the panels P12 to P14 indicate the examination results of mutually the same type (the specimen examinations, the blood tests), these pieces of examination data are displayed in mutually the same panel; however, possible display modes are not limited to this example. For instance, the pieces of examination data may be displayed in mutually the same panel by using a display mode such as a graph format. Alternatively, each of the pieces of examination data may individually be displayed in a separate panel.

Further, for example, when the examination data is numerical value data such as measured values, the display controlling function 155 may switch between display modes of the examination data, depending on which one of reference ranges for measured values corresponds to the measured value indicated in the examination result of the examination data. In the present example, the reference ranges are indices used for determining a health condition (or a state) of the patient, by judging a normal/abnormal state or determining a degree of seriousness, for example. It is assumed that a reference range is set in advance for each type of examination or each of the measured values.

For example, the display controlling function 155 may determine the degree of seriousness serving as an example of the health condition of the patient, by comparing a reference range of measured values with the measured value indicated in the examination result of the examination data and so as to change the display mode of the examination data in accordance with the determined degree of seriousness. In this situation, the method for changing the display mode is not particularly limited, and it is possible to adopt various methods. For example, the display controlling function 155 may change the display color of the examination data or the color of the panel in accordance with the state of the patient such as the degree of seriousness. In another example, the display controlling function 155 may display an icon or a message indicating the state of the patient so as to be kept in correspondence with the examination data. With these arrangements, the user of the medical information processing apparatus 100 is able to easily understand what state the patient is in, by viewing the examination data displayed in the data display region G12.

Figure 12:
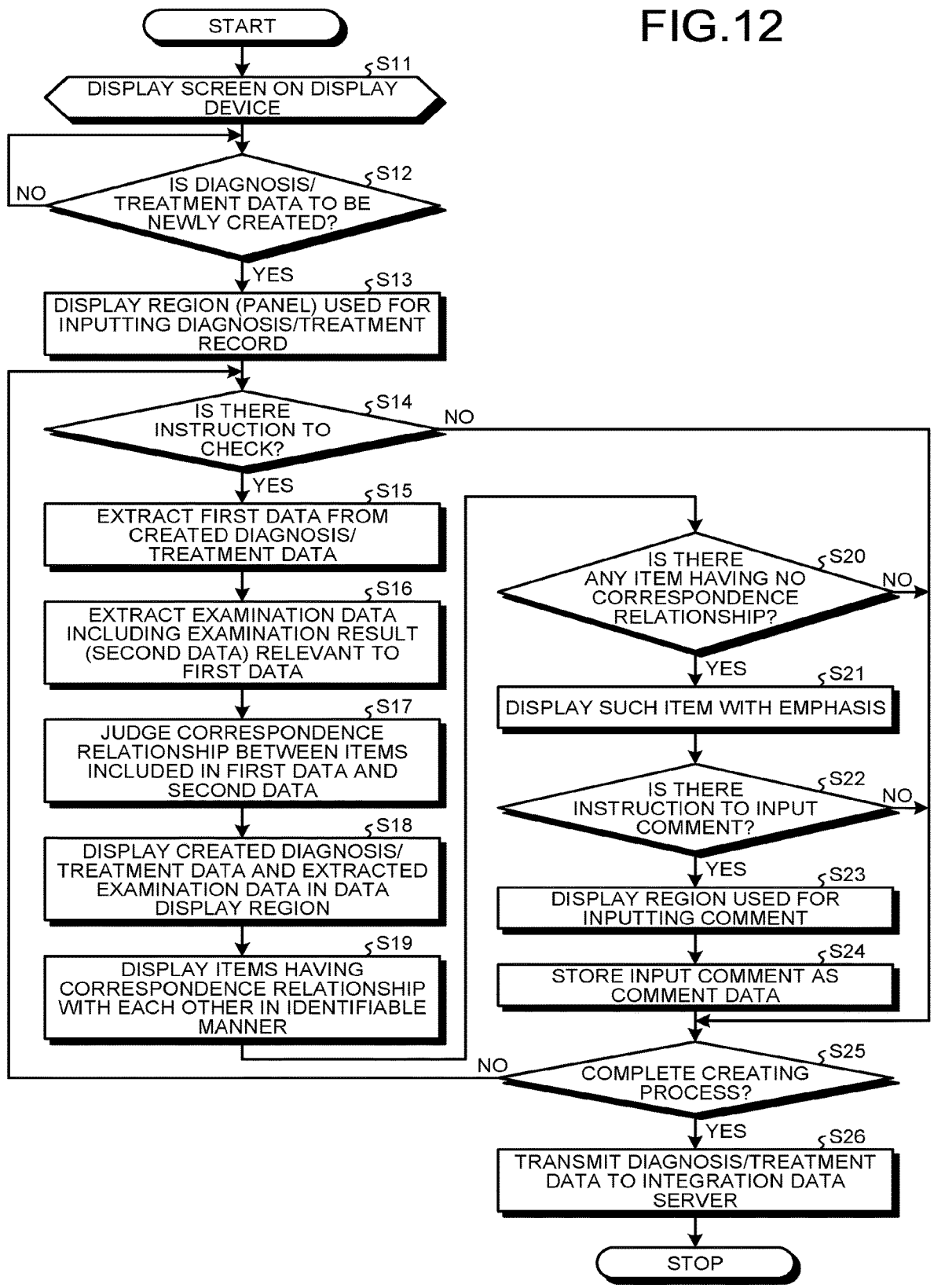
FIG. 12 is a flowchart illustrating an example of a process performed by the medical information processing apparatus according to the embodiment.

Next, an example of the operations of the medical information processing apparatus 100 described above will be explained with reference to FIG. 12. FIG. 12 is a flowchart illustrating an example of a process performed by the medical information processing apparatus 100. The present process is based on a premise that the screen illustrated in FIG. 6 is displayed on the display 140, after the patient ID of the patient is input (step S11). Further, the following will explain the example of the operations performed when a piece of diagnosis/treatment data is to be newly created.

The display controlling function 155 stands by until there is an instruction to create a new piece of diagnosis/treatment data (step S12: No). Upon receipt of an instruction to create a new piece of diagnosis/treatment data (step S12: Yes), the display controlling function 155 collaborates with the data managing function 151 to cause a region (a panel) to be displayed in the data display region G12 in which it is possible to input a diagnosis/treatment record (step S13). In addition, until an instruction to create diagnosis/treatment data is issued, the user of the medical information processing apparatus 100 is also able to cause a desired piece of medical data to be displayed in the data display region G12 via the timeline display region G11.

Subsequently, via the input interface 130 or the like, upon receipt of an instruction to check the diagnosis/treatment record that was newly input (step S14: Yes), the data managing function 151 stores the input diagnosis/treatment record into the storage 120, as a new piece of diagnosis/treatment data. On the contrary, when no instruction to check the diagnosis/treatment record is issued (step S14: No), the process proceeds to step S25.

When the new piece of diagnosis/treatment data is stored in the storage 120, the first extracting function 152 extracts first data indicating the diagnosis/treatment record from the diagnosis/treatment data (step S15). Further, the second extracting function 153 extracts diagnosis/treatment data including second data indicating an examination record relevant to the first data extracted at step S15, from among the diagnosis/treatment data of the patient managed by the integration data server 400 (step S16). Subsequently, by comparing the items included in the first data with the items included in the second data, the determining function 154 judges a correspondence relationship between the two sets of items (step S17).

On the basis of the processing results from steps S15 though S17, the display controlling function 155 causes the examination data to be displayed in the data display region G12. More specifically, the display controlling function 155 causes the newly-created piece of diagnosis/treatment data and the examination data extracted by the second extracting function 153 to be displayed in the data display region G12 (step S18). Further, the display controlling function 155 causes the items determined as having a correspondence relationship at step S17 to be displayed in an identifiable manner (step S19).

Subsequently, the display controlling function 155 judges whether or not there is any item determined at the judging process at step S17 as having no correspondence relationship (step S20). When there is at least one item determined as having no correspondence relationship (step S20: Yes), the display controlling function 155 displays the item having no correspondence relationship with an emphasis (step S21) and proceeds to step S22. When there is no item determined as having no correspondence relationship (step S20: No), the process proceeds to step S25.

After that, the display controlling function 155 judges whether or not an instruction to input a comment has been issued via the input interface 130 or the like (step S22). Upon receipt of an instruction to input a comment (step S22: Yes), the display controlling function 155 causes a region used for inputting the comment to be displayed in the data display region G12 (step S23). Further, upon receipt of an instruction to complete inputting the comment, the data managing function 151 stores the input content in the input region as comment data (step S24) and proceeds to step S25. On the contrary, when there is no instruction to input a comment (step S22: No), the process proceeds to step S25 immediately.

Subsequently, the data managing function 151 judges whether or not the user has instructed to complete the diagnosis/treatment data creating process (step S25). When there is no instruction to complete the creating process (step S25: No), the data managing function 151 returns the process to step S15 so that the diagnosis/treatment data creating process is continued. In that situation, because the state of the diagnosis/treatment data is in the process of being created, the user of the medical information processing apparatus 100 is also able to directly edit the writing related to the items determined as having no correspondence relationship and the like, within the currently-created diagnosis/treatment data.

On the contrary, when the user has instructed to complete the creating process (step S25: Yes), the data managing function 151 stores the created diagnosis/treatment data being completed into the storage 120 and further transmits the diagnosis/treatment data to the integration data server 400 so as to be stored in the integration DB 410 (step S26).

As explained above, in the present embodiment, the examination data indicating the examination result relevant to the diagnosis/treatment record written in the diagnosis/treatment data of the patient is extracted, so that the diagnosis/treatment data and the extracted examination data are displayed on mutually the same screen. Further, in the present embodiment, the correspondence relationships are judged between the items included in the diagnosis/treatment data and in the examination data, so as to display the items having the correspondence relationship between the two types of data in the identifiable manner. With these arrangements, the user of the medical information processing apparatus 100 is able to easily understand the examination data including the examination result serving as a basis of the diagnosis/treatment record written in the diagnosis/treatment data. In addition, the user is able to easily understand where in the examination data the examination result serving as the basis of the diagnosis/treatment record is positioned. Consequently, according to the present embodiment, it is possible to enhance convenience related to creating and reading/understanding the diagnosis/treatment data.

Further, in the present embodiment, among the items included in the diagnosis/treatment data and in the examination data, when there is an independent item having no correspondence relationship, the item is displayed in an identifiable manner. With this arrangement, in the present embodiment, when an examination result failed to be written in the diagnosis/treatment data or when a diagnosis/treatment record having no sufficient basis is written in the diagnosis/treatment data, it is possible to make the user aware of such an item. It is therefore possible to prevent incomplete or inadequate diagnosis/treatment data from being created.

Further, in the present embodiment, between the diagnosis/treatment data and the examination data, when there is an item determined as having no correspondence relationship, the user interface is provided in which it is possible to input the comment related to such an item, so that the content of the input comment is saved while being kept in correspondence therewith. With these arrangements, the user of the medical information processing apparatus 100 is able to keep a record, as the comment, of the reason why no examination result is reflected in the diagnosis/treatment data or of the reason why a diagnosis/treatment record having no sufficient basis is written in the diagnosis/treatment data. In addition, for example, the user of the medical information processing apparatus 100 is able to request a re-examination via the interface provided by the medical information processing apparatus 100, when the user did not cause an examination result written in the examination data to be reflected in a diagnosis/treatment record because the level of precision of the examination result is doubtful. Consequently, according to the present embodiment, it is possible to enhance convenience related to creating and reading/understanding the diagnosis/treatment data.

Alternatively, the embodiments described above may be carried out while being modified as appropriate, by changing a part of the configuration or the functions of the medical information processing apparatus 100. Thus, in the following sections, a number of modification examples of the above embodiments will be described. In the following sections, differences from the above embodiments will primarily be described, and detailed explanations of certain features that have already been described will be omitted. Further, the modification examples described below may individually be carried out or may be carried out in combination as appropriate.

First Modification Example

In the above embodiments, the example was explained in which the user is informed of the incompleteness or inadequacy (missing information or the basis not being sufficient) of the diagnosis/treatment record written in the diagnosis/treatment data, on the basis of the judgment result from the determining function 154; however, it is also acceptable to use the judgment result from the determining function 154 for other purposes. For example, it is also possible to record the number of items determined by the determining function 154 as having no correspondence relationship, for the purpose of judging a level of proficiency or a level of reliability related to creating the diagnosis/treatment data.

More specifically, every time a new piece of diagnosis/treatment data is created, the data managing function 151 counts the total number of items determined as having no correspondence relationship in the diagnosis/treatment data, with respect to each of the creators (the medical providers) of the diagnosis/treatment data. For example, the counted values are stored in a storage or the like of the integration data server 400 so as to be kept in correspondence with the medical provider IDs of the creators.

With this arrangement, according to the present modification example, it is possible to judge levels of proficiency or levels of reliability of the medical providers related to the creation of the diagnosis/treatment data, by referring to the counted values. Further, the data managing function 151 may be configured to also record the total number of pieces of diagnosis/treatment data having been created or the number of times a comment is input, together with the abovementioned counted values.

Second Modification Example

In the above embodiments, the example was explained in which the examination data extracted by the second extracting function 153 is displayed on the screen displaying the diagnosis/treatment data from which the first data was extracted by the first extracting function 152; however, depending on the number of pieces of examination data or the volume of the information extracted by the second extracting function 153, it may not be possible, in some situations, to display all the examination data on the screen.

Figure 13:
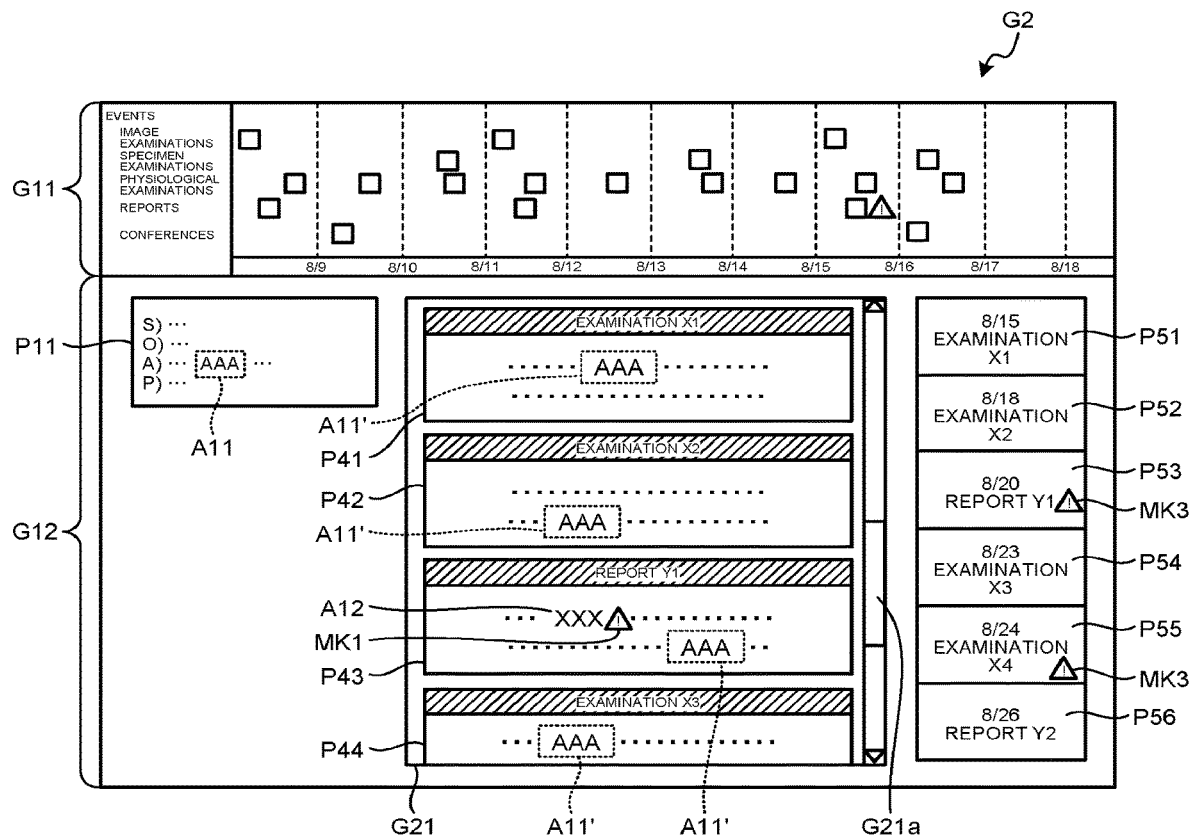
FIG. 13 is a drawing illustrating an example of a screen displayed by a display controlling function according to a second modification example of the embodiment.
Figure 14:
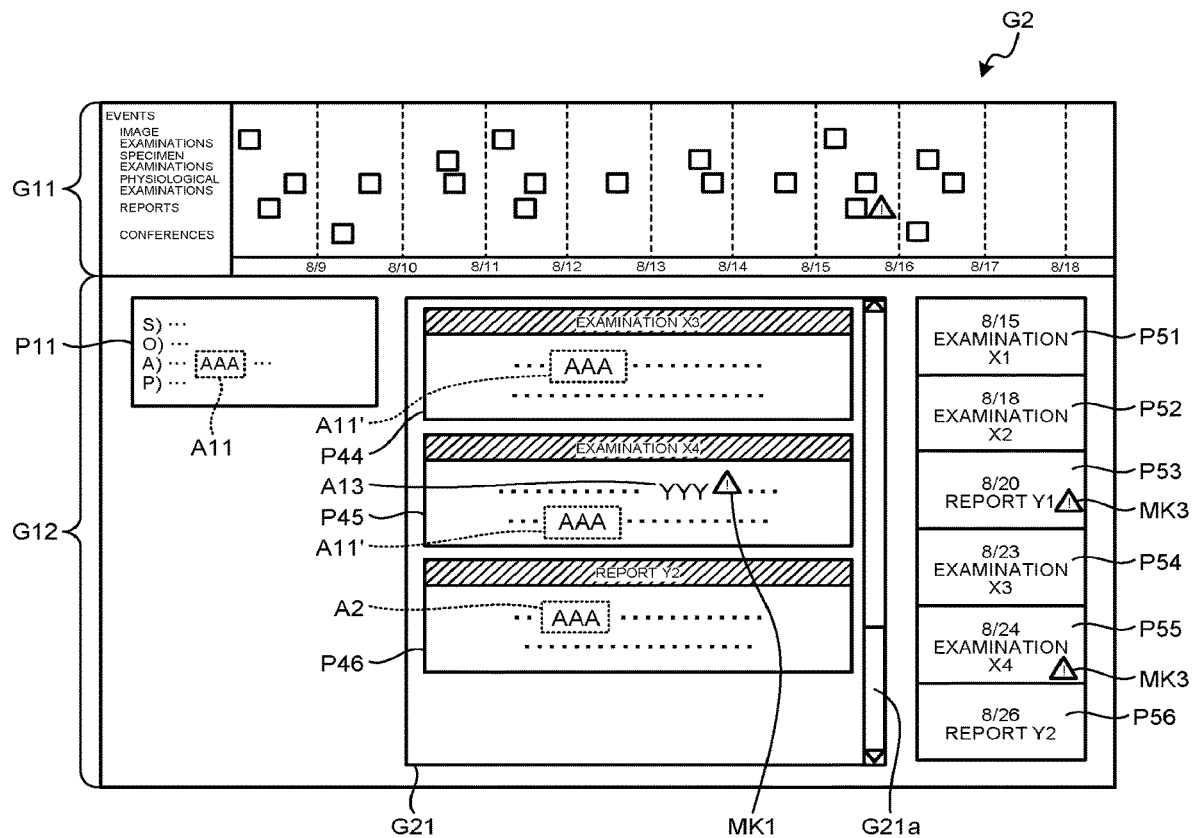
FIG. 14 is a drawing illustrating another example of a screen displayed by the display controlling function according to the second modification example of the embodiment.

To cope with these situations, the display controlling function 155 may display one of the screens illustrated in FIGS. 13 and 14, in place of the examples of the screens described in the above embodiments. FIGS. 13 and 14 are drawings illustrating examples of screens displayed by the display controlling function 155 according to the present modification example.

As illustrated in FIG. 13, similarly to the screen G1 explained in the first embodiment, the screen G2 includes the timeline display region G11 and the data display region G12. Further, similarly to the first embodiment, the data display region G12 displays the diagnosis/treatment data. Although FIG. 13 illustrates the example in which the single piece of diagnosis/treatment data is displayed in the panel P11, a plurality of pieces of diagnosis/treatment data may be displayed, as explained with reference to FIG. 11.

Further, the data display region G12 is provided with an examination data display region G21 used for displaying the examination data extracted by the second extracting function 153. More specifically, the examination data display region G21 displays each of the pieces of examination data extracted by the second extracting function 153 in a panel. FIG. 13 illustrates an example in which six pieces of examination data have been extracted. The six pieces of examination data are displayed next to one another in the panels P41 to P46. FIG. 13 illustrates the state in which the panels P41 to P44 among the panels P41 to P46 are displayed. The other panels P45 and P46 are in a non-display state. The panels P41 to P46 hereinafter may collectively be referred to as panels P4.

In the present example, the examination data display region G21 is provided with a scroll bar G21a. It is possible to perform a scroll operation on the scroll bar G21a along the alignment direction of the panels P4. In response to user operations (scroll operations), the panels P4 in the examination data display region G21 are moved. For example, in the examination data display region G21 in FIG. 13, when the scroll bar G21a is scrolled toward the bottom of the screen, the panels P41 to P46 arranged in the examination data display region G21 are moved toward the top of the screen. As a result, the user of the medical information processing apparatus 100 is able to cause the panels P45 and P46, which were in the non-display state in FIG. 13, to be displayed in the examination data display region G21 as illustrated in FIG. 14.

Further, similarly to the above embodiments, the display controlling function 155 is configured to cause the items in the diagnosis/treatment data and in the examination data determined by the determining function 154 as having correspondence relationships to be displayed in an identifiable manner. For example, in FIGS. 13 and 14, the display controlling function 155 causes the item A11 in the panel P11 and the items A11' in the panels P41 to P46 determined by the determining function 154 as having correspondence relationships to be displayed in an identifiable manner. With these arrangements, the medical information processing apparatus 100 according to the present modification example is able achieve the same advantageous effects as those of the above embodiments. Consequently, the user of the medical information processing apparatus 100 is able to easily understand where in the examination data the examination result serving as a basis of the diagnosis/treatment record is positioned, by viewing the diagnosis/treatment data and the examination data displayed in the identifiable manner.

Further, similarly to the above embodiments, the display controlling function 155 causes any item determined by the determining function 154 as having no correspondence relationship to be displayed in an identifiable manner. For example, in FIGS. 13 and 14, the display controlling function 155 causes the items A12 and A13 in the panels P22 and P24 determined by the determining function 154 as having no correspondence relationship to be displayed with the marker MK1 appended thereto. With this arrangement, the medical information processing apparatus 100 according to the present modification example is able to achieve the same advantageous effects as those of the above embodiments. Consequently, the user of the medical information processing apparatus 100 is able to easily understand which one of the items written in the examination data is not reflected in the diagnosis/treatment data.

Further, the data display region G12 displays an operation element used for instructing that the examination data extracted by the second extracting function 153 be displayed. FIGS. 13 and 14 illustrate an example in which, on the right side in the examination data display region G21, operation panels P51 to P56 serving as examples of the operation element are displayed. The operation panels P51 to P56 hereinafter may collectively be referred to as operation panels P5.

Each of the operation panels P5 is provided for a different one of the pieces of examination data extracted by the second extracting function 153. The operation panels P5 display information that make the corresponding pieces of examination data identifiable. For example, the operation panels P5 display information such as the date of creation of the examination data, the type of the examination data, the data names, and/or the like. In this situation, the operation panels P51 to P56 correspond to the pieces of examination data displayed in the panels P41 to P46, respectively. In an example, the operation panel P51 displays the date of creation of the corresponding piece of examination data (the examination data in the panel P41), as well as the data name "Examination X1" of the examination data. As a result, the user of the medical information processing apparatus 100 is able to easily understand which piece of examination data is instructed to be displayed by each of the operation panels P5.

Further, when the examination data extracted by the second extracting function 153 includes one or more items determined as having no correspondence relationship, the display controlling function 155 is configured to display, in an appended manner, information indicating that there are one or more items determined as having no correspondence relationship, within the operation panels P5 corresponding to the examination data. As explained above, in the examples illustrated in FIGS. 13 and 14, the examination data related to the panels P43 and P45 include the items A12 and A13 determined as having no correspondence relationship. For this reason, the display controlling function 155 displays the markers MK3 indicating that there are items determined as having no correspondence relationship, so as to be appended to the operation panels P53 and P55 corresponding to the examination data in the panels P43 and P45. With these arrangements, the user of the medical information processing apparatus 100 is able to easily understand which operation panels P5 correspond to the examination data having the items that are not reflected in the diagnosis/treatment data.

Upon receipt of a selection operation on any of the operation panels P5, the display controlling function 155 causes the examination data corresponding to the selected operation panel P5 to be displayed in the examination data display region G21. In this situation, the method for displaying the examination data via the operation panels P5 is not particularly limited, and it is possible to use various display methods.

For example, as illustrated in FIG. 13, when the examination data extracted by the second extracting function 153 is displayed in advance in the examination data display region G21 in a scrollable form, it is possible to use one or all of the following display methods: In an example, the display controlling function 155 may automatically scroll the panels so that one of the panels P4 of the examination data corresponding to the selected operation panel P5 is displayed in the examination data display region G21. In that situation, the display controlling function 155 may automatically scroll the panels so that the one of the panels P4 of the examination data corresponding to the selected operation panel P5 is positioned at the center of the examination data display region G21. In addition, the display controlling function 155 may display the one of the panels P4 of the examination data corresponding to the selected operation panel P5 in an identifiable manner.

Figure 15:
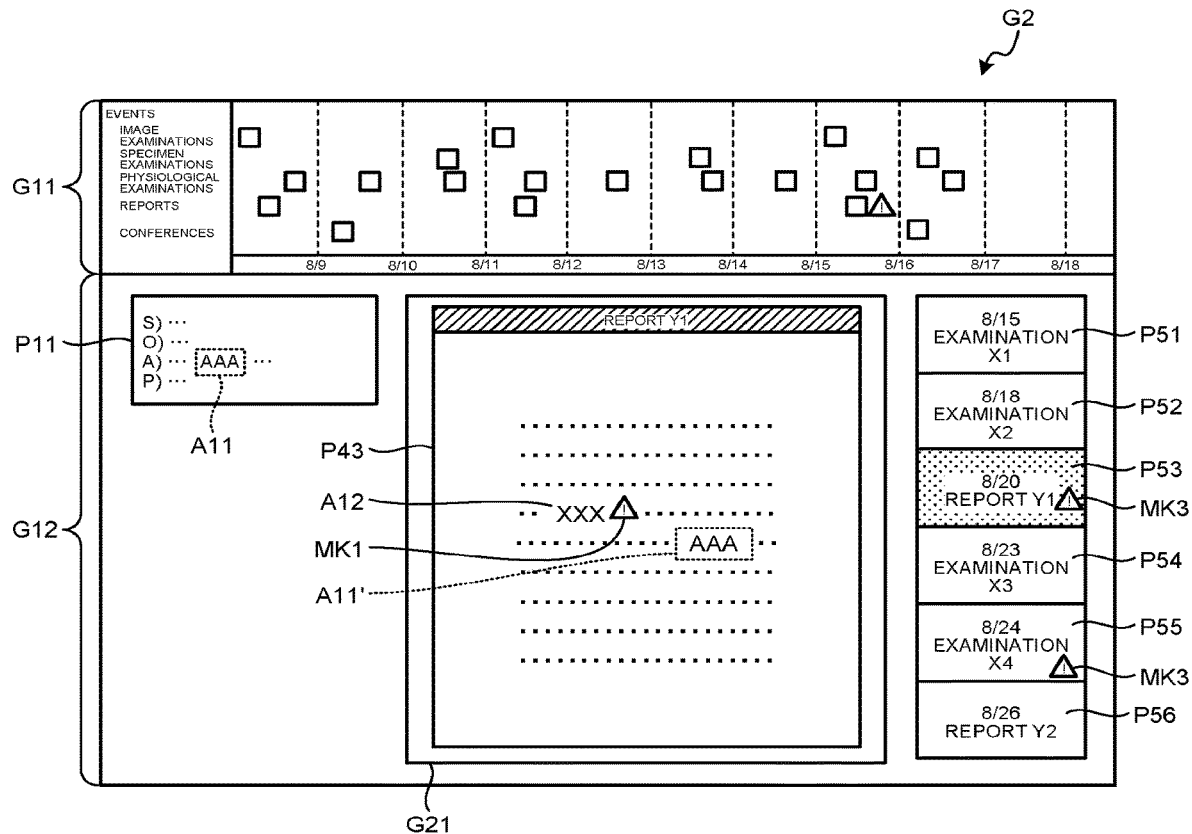
FIG. 15 is a drawing illustrating yet another example of a screen displayed by the display controlling function according to the second modification example of the embodiment.

As another display method, the display controlling function 155 may, as illustrated in FIG. 15, cause only the one of the panels P4 of the examination data corresponding to the selected operation panel P5 to be displayed in the examination data display region G21. FIG. 15 is a drawing illustrating the example of the screen displayed by the display controlling function 155 according to the present modification example and illustrates the display example presented when the operation panel P53 has been selected.

As illustrated in FIG. 15, upon receipt of an operation to select the operation panel P53, the display controlling function 155 causes the panel P43 indicating the examination data corresponding to the operation panel P53 to be displayed in the examination data display region G21. In this situation, for example, it is acceptable to configure the operation panel P5 as a toggle button or the like, so that it is possible to alternately switch between a selected state and a cancelled state.

According to the display method illustrated in FIG. 15, the number of pieces of examination data that can be selected via the operation panels P5 does not necessarily have to be one and may be two or more. For example, when the operation panels P53 and P55 are selected, the display controlling function 155 causes the operation panels P43 and P45 of the examination data corresponding to the operation panels P53 and P55 to be displayed next to each other in the examination data display region G21. In this situation, the order in which the panels P4 are arranged may be an order according to the dates of creation or an order of the pieces of examination data selected in the operation panels P5.

As explained above, according to the present modification example, even in the situation where it is not possible to display all of the pieces of examination data extracted by the second extracting function 153 on mutually the same screen at once, it is possible to cause the examination data in the non-display state to be displayed with the simple operation. Consequently, according to the present modification example, it is possible to enhance convenience related to creating and reading/understanding the diagnosis/treatment data.

Third Modification Example

In the above embodiments, the medical information processing apparatus 100 includes the data managing function 151, the first extracting function 152, the second extracting function 153, the determining function 154, and the display controlling function 155; however, another arrangement is also acceptable in which a part or all of the functions are included in an apparatus other than the medical information processing apparatus 100.

For example, the integration data server 400 may include a part or all of the abovementioned functions. In that situation, the integration data server 400 functions as a medical information processing apparatus and is configured to cause the display 140 of the medical information processing apparatus 100 to display the abovementioned various types of screens in the form of a web service, for example. Further, the medical information processing apparatus does not necessarily have to be realized by using a single computer apparatus and may be realized by using a plurality of computer apparatuses connected to a network.

In the embodiments described above, the example was explained in which the data managing unit, the first extracting unit, the second extracting unit, the determining unit, and the display controlling unit of the present disclosure are realized as the data managing function 151, the first extracting function 152, the second extracting function 153, the determining function 154, and the display controlling function 155 of the processing circuitry 150, respectively; however, possible embodiments are not limited to this example. However, instead of being realized as the data managing function 151, the first extracting function 152, the second extracting function 153, the determining function 154, and the display controlling function 155 described in the embodiments, the functions of the data managing unit, the first extracting unit, the second extracting unit, the determining unit, and the display controlling unit of the present disclosure may be realized by using only hardware or a combination of hardware and software.

Further, the term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). One or more processors realize the functions by reading and executing programs saved in the storage 120. In this situation, instead of saving the programs in the storage 120, the programs may directly be incorporated in the circuits of the one or more processors. In that situation, the one or more processors realize the functions by reading and executing the programs incorporated in the circuits thereof. Further, the processors of the present embodiments do not each necessarily have to be configured as a single circuit. It is also acceptable to structure one processor by combining together a plurality of independent circuits, so as to realize the functions thereof.

In this situation, the programs executed by the one or more processors are provided as being incorporated, in advance, in a Read Only Memory (ROM), a storage unit, or the like. Alternatively, the programs may be provided as being recorded in a computer-readable storage medium such as a Compact Disk Read-Only Memory (CD-ROM), a Flexible Disk (FD), a Compact Disk Recordable (CD-R), a Digital Versatile Disk (DVD), or the like, in a file in a format that is installable or executable by these devices. Further, the programs may be stored in a computer connected to a network such as the Internet so as to be provided or distributed as being downloaded via the network. For example, the programs are structured with modules including the functional units described above. In the actual hardware, as a result of a CPU reading and executing the programs from a storage medium such as a ROM, the modules are loaded into a main storage so as to be generated in the main storage.

According to at least one aspect of the embodiments and the modification examples described above, it is possible to easily understand the correspondence relationship between the diagnosis/treatment record written in the diagnosis/treatment data and the examination result serving as a basis of the diagnosis/treatment record.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus, comprising:
    processing circuitry configured to:
        extract, from diagnosis and treatment data in which a diagnosis and treatment record of a patient is written, first data indicating the diagnosis and treatment record;
        extract a piece of examination data including second data indicating an examination result relevant to the first data, from one or more pieces of examination data, in each of which an examination result of the patient is written;
        determine a correspondence relationship between a first item included in the extracted first data and a second item included in the second data of the extracted piece of examination data;
        cause the diagnosis and treatment data and the extracted piece of examination data to be displayed on a same screen, and cause the first and second items determined as having the correspondence relationship with each other to be displayed in an identical format distinct from a format of other items included in the first data and the second data; and
        count a total number of items determined as having no correspondence relationship, with respect to each medical provider who created the diagnosis and treatment data,
    wherein the processing circuitry is further configured to
        between items included in the first data and items included in the second data, when there is an independent item that does not have the correspondence relationship, the processing circuitry is further configured to determine that the independent item has no correspondence relationship;
        cause a selectable marker to be inserted and displayed adjacent to the independent item; and
        in response to an operation of a user selecting the displayed marker, cause an input window to be displayed adjacent to the displayed marker, the window allowing the user to enter comments related to the independent item.

2. The medical information processing apparatus according to claim 1, wherein, between the first item included in the first data and the second item included in the second data, when content thereof is identical or similar between the items, the processing circuitry is further configured to determine that the first and second items have the correspondence relationship with each other.

3. The medical information processing apparatus according to claim 1, wherein
    the processing circuitry is further configured to cause the independent item determined as having no correspondence relationship to be displayed in an identifiable manner.

4. The medical information processing apparatus according to claim 1, wherein
    the processing circuitry is further configured to determine that the independent item has no correspondence relationship when one of the following is true: the first data includes no content corresponding to the independent item, which is included in the second data, and the second data includes no content corresponding to the independent item, which is included in the first data.

5. The medical information processing apparatus according to claim 1, wherein, with respect to each piece of the one or more pieces of examination data, the processing circuitry is further configured to cause the screen to display an operation element used for instructing that the piece of examination data be displayed, and
    in response to an operation performed on any of the operation elements, the processing circuitry is further configured to cause the screen to display the piece of examination data corresponding to the displayed operation element.

6. The medical information processing apparatus according to claim 5, wherein, when any of the extracted pieces of examination data includes an item determined as having no correspondence relationship, the processing circuitry is further configured to cause information indicating that the item having no correspondence relationship is present to be displayed so as to be appended to the displayed operation element corresponding to the piece of examination data.

7. The medical information processing apparatus according to claim 1, wherein, when the examination data is numerical value data, the processing circuitry is further configured to switch between display modes of the examination data in accordance with a health condition of the patient that is determined by comparing a measured value indicated in the examination result of the examination data with a reference range of the measured value related to determining the health condition of the patient.

8. The medical information processing apparatus according to claim 1, wherein
    the processing circuitry is further configured to perform a process related to creating a new piece of diagnosis and treatment data, and
    the processing circuitry is further configured to extract the first data from the newly-created piece of diagnosis and treatment data.

9. A medical information processing method, comprising:
    extracting, from diagnosis/treatment data in which a diagnosis and treatment record of a patient is written, first data indicating the diagnosis and treatment record;
    extracting a piece of examination data including second data indicating an examination result relevant to the first data, from one or more pieces of examination data in each of which an examination result of the patient is written;
    determining a correspondence relationship between a first item included in the extracted first data and a second item included in the second data of the extracted piece of examination data;
    causing the diagnosis and treatment data and the extracted piece of examination data to be displayed on a same screen, and causing the first and second items determined as having the correspondence relationship with each other to be displayed in an identical format distinct from a format of other items included in the first data and the second data; and counting a total number of items determined as having no correspondence relationship, with respect to each medical provider who created the diagnosis and treatment data, wherein the method further comprises
- between items included in the first data and items included in the second data, when there is an independent item that does not have the correspondence relationship, determining that the independent item has no correspondence relationship;
- causing a selectable marker to be inserted and displayed adjacent to the independent item; and
- in response to an operation of a user selecting the displayed marker, causing an input window to be displayed adjacent to the displayed marker, the window allowing the user to enter comments related to the independent item.

\* \* \* \* \*